United States Patent
Graham et al.

(10) Patent No.: US 9,642,312 B2
(45) Date of Patent: May 9, 2017

(54) BALE PROCESSOR

(71) Applicant: Vermeer Manufacturing Company, Pella, IA (US)

(72) Inventors: Lucas B. Graham, New Sharon, IA (US); Luke A. Mushitz, Monroe, IA (US); Philip D. Stam, Pella, IA (US)

(73) Assignee: Vermeer Manufacturing Company, Pella, IA (US)

( * ) Notice: Subject to any disclaimer, the term of this patent is extended or adjusted under 35 U.S.C. 154(b) by 655 days.

(21) Appl. No.: 14/023,677

(22) Filed: Sep. 11, 2013

(65) Prior Publication Data

US 2015/0069158 A1    Mar. 12, 2015

(51) Int. Cl.
| | | |
|---|---|---|
| *A01D 87/10* | (2006.01) | |
| *A01F 29/00* | (2006.01) | |
| *A01F 29/12* | (2006.01) | |
| *A01K 5/00* | (2006.01) | |
| *A01D 87/00* | (2006.01) | |
| *B02C 13/28* | (2006.01) | |
| *B02C 19/00* | (2006.01) | |

(52) U.S. Cl.
CPC ........ *A01F 29/005* (2013.01); *A01D 87/0007* (2013.01); *A01D 87/10* (2013.01); *A01F 29/12* (2013.01); *A01K 5/005* (2013.01); *B02C 13/2804* (2013.01); *B02C 19/0018* (2013.01)

(58) Field of Classification Search
CPC ....... A01K 5/005; A01F 29/12; A01F 29/005; A01F 29/00–29/22; B02C 19/00; B02C 19/0018; B02C 13/2804; B02C 13/286; A01D 87/10

USPC ........ 241/92, 101.5, 186.3, 189.1, 277, 605, 241/57, 60
See application file for complete search history.

(56) References Cited

U.S. PATENT DOCUMENTS

| | | |
|---|---|---|
| 784,270 A | 3/1905 | Morton |
| 1,482,048 A | 1/1924 | Stephenson |
| 2,629,385 A | 2/1953 | Kochalski |
| 2,952,493 A | 9/1960 | Finn |
| 2,954,730 A | 10/1960 | Moser |

(Continued)

FOREIGN PATENT DOCUMENTS

| | | |
|---|---|---|
| CA | 1313992 | 3/1993 |
| EP | 0793911 | 9/1997 |
| WO | 2013066287 | 5/2013 |

OTHER PUBLICATIONS

Copy—color—6-page brochure entitled "Bale Processors" by Vermeer Corporation, showing BPX9000.

(Continued)

*Primary Examiner* — Faye Francis
*Assistant Examiner* — Onekki Jolly
(74) *Attorney, Agent, or Firm* — Sturm & Fix LLP

(57) ABSTRACT

A bale processor of a type for tearing apart a bale of forage material into filamentary material includes a shredder rotor with blades that remove filamentary portions of the bale and delivers such filamentary material directly to a multiple fan blower for blowing such filamentary material directly to and out of a delivery chute. An independent dual discharge feature permits discharge out of either side and/or one or more blowers placed closer to the shredder rotor can be used independently of the dual discharge feature and the multiple fan blower feature.

18 Claims, 27 Drawing Sheets

(56) References Cited

U.S. PATENT DOCUMENTS

| | | | |
|---|---|---|---|
| 3,241,173 A | 3/1966 | Finn | |
| 4,056,107 A * | 11/1977 | Todd | A01D 41/1243 460/112 |
| 4,288,933 A | 9/1981 | Fair | |
| 4,934,615 A | 6/1990 | Osborne | |
| 5,915,835 A | 6/1999 | Fair | |
| 6,027,054 A * | 2/2000 | Kaye | A01F 29/005 241/101.74 |
| 6,109,488 A * | 8/2000 | Horton | E04F 21/085 222/238 |
| 6,155,506 A * | 12/2000 | Loppoli | A01D 90/105 241/101.76 |
| 6,406,368 B1 | 6/2002 | Cruson | |
| 6,572,039 B1 * | 6/2003 | Kruer | A01F 29/005 241/101.76 |
| 6,598,812 B1 | 7/2003 | Matousek | |
| 6,602,131 B2 | 8/2003 | Wolters | |
| 6,656,038 B1 | 12/2003 | Persson | |
| 6,736,721 B2 | 5/2004 | Niermann | |
| 7,086,942 B2 | 8/2006 | Niermann | |
| 7,094,146 B2 | 8/2006 | Holmen | |
| 7,331,855 B2 | 2/2008 | Johnson | |
| 7,383,678 B2 | 6/2008 | Buss | |
| 7,553,227 B2 | 6/2009 | Landuyt | |
| 7,748,421 B2 | 7/2010 | Everett | |
| 7,757,469 B2 | 7/2010 | Priepke | |
| 8,066,208 B2 | 11/2011 | Bennett | |
| 8,105,140 B2 | 1/2012 | Teroerde | |
| 8,118,650 B2 | 2/2012 | Isaac | |
| 2002/0195509 A1 * | 12/2002 | Lepage | A01D 87/122 241/186.3 |
| 2005/0077404 A1 * | 4/2005 | Kisenwether | A01K 5/005 241/101.76 |
| 2005/0205706 A1 | 9/2005 | LePage | |
| 2010/0193617 A1 | 8/2010 | Marschall | |
| 2011/0139910 A1 | 6/2011 | Neudorf | |
| 2011/0220748 A1 * | 9/2011 | Bennett | A01F 29/005 241/30 |
| 2013/0193247 A1 | 8/2013 | Graham | |

OTHER PUBLICATIONS

Copy—9-pages—Notification and International Search Report from corresponding PCT application.

* cited by examiner

BALE PROCESSOR

TECHNICAL FIELD

This invention relates generally to a bale processor of a type for tearing apart a bale of forage material into filamentary material and more particularly to one that includes a rotor with flails that remove such filamentary portions of the bale and delivers such filamentary material directly to a blower for blowing such filamentary material directly to and out of a delivery chute.

BACKGROUND

There are known ways of moving filamentary material taken from a bale to a delivery chute.

One prior art bale processor uses a rotary shredder, one blower fan and an auger to deliver filamentary material to a discharge chute. Use of such an auger can be prone to plugging, especially if materials such as twine, netwrap or other long fibrous material becomes wrapped around the auger. These auger style machines can also be prone to plugging at the carrier bearing adjacent to the discharge fan.

But while there are problems associated with using an auger, eliminating the auger altogether in such a bale processor is not a simple matter. For example in a six foot bale processor trying to transfer the bale fragments from a shredder directly to a single six foot in diameter fan would be very complicated and expensive to manufacture along with being too heavy for practical application.

Accordingly, there is a need for a bale processor that overcomes the aforementioned problems.

BRIEF SUMMARY OF THE INVENTION

By covering an entire bale chamber tub length with multiple fans, the fan blade placement can be moved closer to the primary shredder flail rotor, thereby reducing the distance the material must travel from the primary flail rotor to the fan blades. This proximity greatly reduces the chance for wet material to bridge or clog the transition area between the flail rotor and fan blades. With the fans located extremely close to the primary shredder flail rotor a secondary conveyance system, such as an auger, to change the direction of material transport from the shredder to the fans is not required. Complete fan blade coverage across the entire tub is accomplished with smaller, cheaper, and simpler to manufacture fans.

Additionally or alternatively, one or more blowers can be placed closer to the bale shredder by installation at an angle between vertical and horizontal so a fan blade would be closer to the bale shredder when it its lowermost position than when the blade is in its uppermost position.

Also additionally or alternatively, providing a discharge opening on both sides of a bale processor will assist in the efficiency of moving the filamentary material from the bale shredder to the place where it is desired to be discharged.

BRIEF DESCRIPTION OF THE DRAWINGS

The above needs are at least partially met through provision of the apparatus described in the following detailed description, particularly when studied in conjunction with the drawings, wherein.

Figure 1:
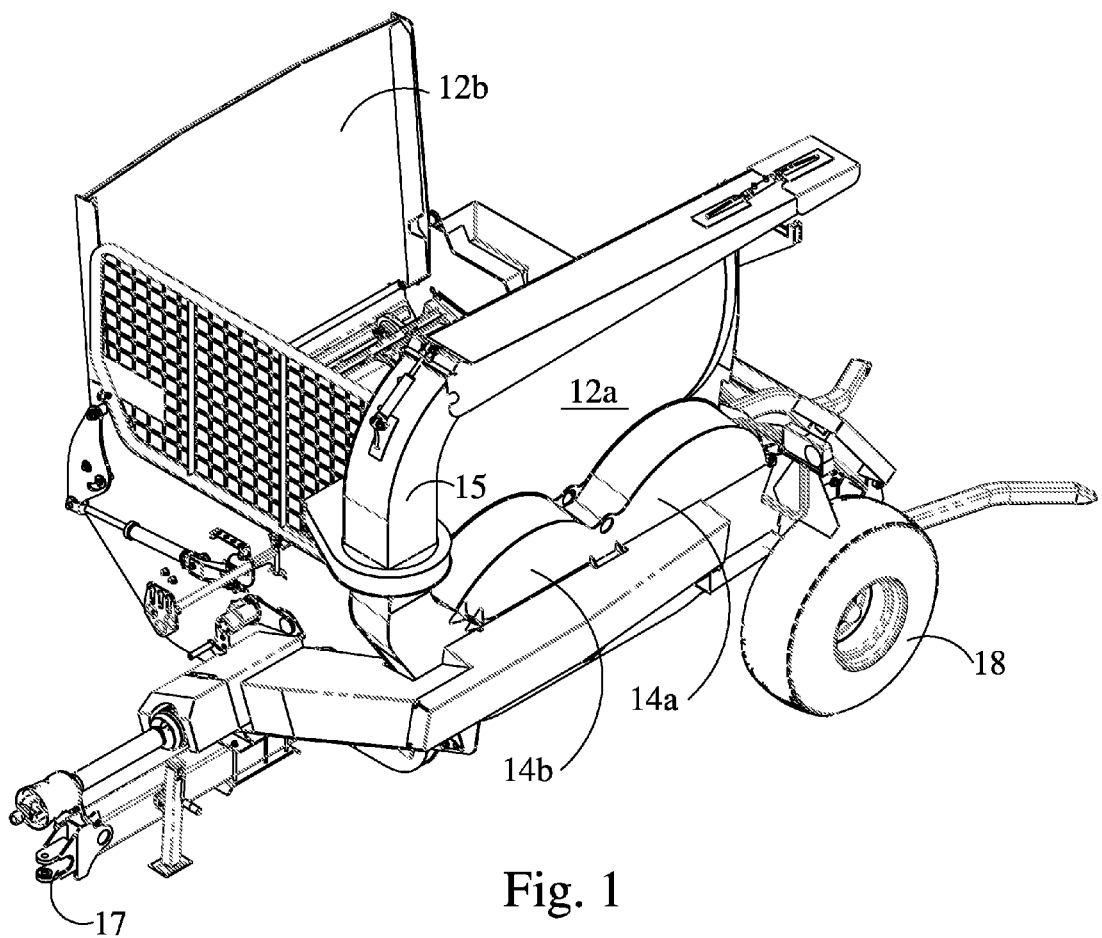
FIG. 1 is a perspective view of a first embodiment of a bale processor constructed in accordance with the present invention.
Figure 2:
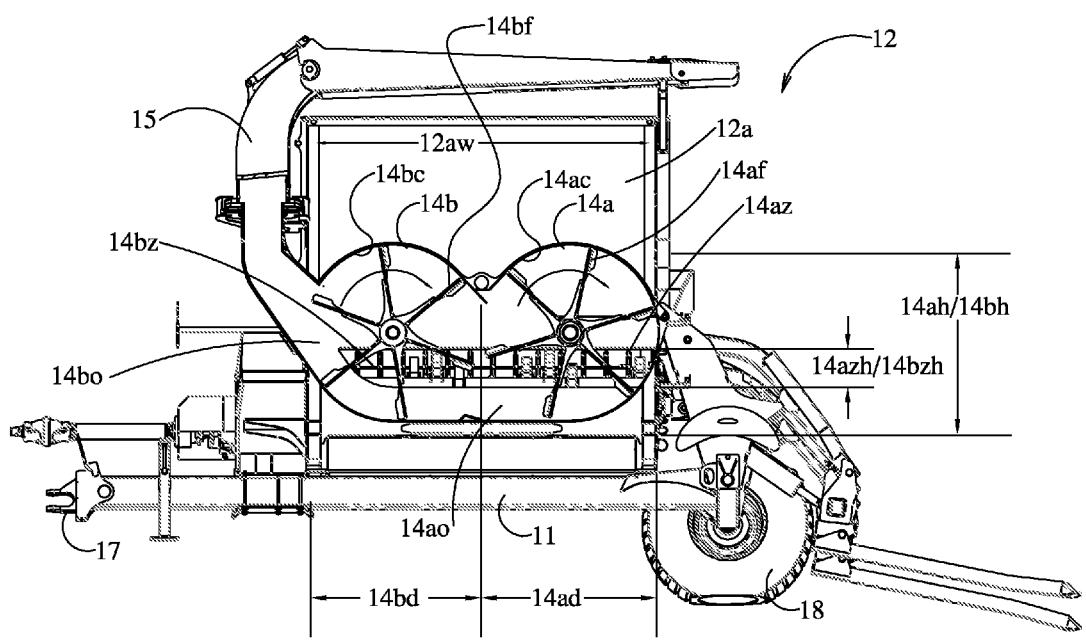
FIG. 2 is a cross sectional view through the left side showing the inside of a twin blower and showing the intake portion thereof of the bale processor of FIG. 1.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence may not actually be required. The terms and expressions used herein have the ordinary technical meaning as is accorded to such terms and expressions by persons skilled in the technical field as set forth above except where different specific meanings have otherwise been set forth herein.

DETAILED DESCRIPTION

Referring now to the drawings, wherein like reference numerals indicate identical or similar parts throughout the several views, FIGS. 1-6 show a bale processor having a frame (11). A bale chamber (12) is disposed on the frame (11), the bale chamber (12) being defined by a plurality of chamber walls (12a-12d). A bale shredder (13) is operatively positioned within the bale chamber (12). This bale shredder can be like that shown U.S. patent application Ser. No. 13/749,895 to Graham, which is incorporated hereby by reference in its entirety.

A plurality of blowers (14a/14b) mounted proximate one another along are disposed along chosen chamber wall (12a). Each blower (14a/14b) respectively includes a blower chamber (14ac/14bc) and a blower fan (14af/14bf) operatively mounted within the corresponding blower chamber (14ac/14bc). Each blower chamber (14ac/14bc) defines a respective chamber height (14ah/14bh) and has a respective blower intake zone (14az/14bz) defined therein. Each blower intake zone (14az/14bz) connects the respective blower chamber with the bale chamber (12) and each blower intake zone (14az/14bz) is configured to receive a respective amount of the bale filamentary material there through. Each blower intake zone (14az/14bz) has an intake zone height (14azh/14bzh) which is less than a corresponding chamber height (14ah/14bh). The corresponding blower fan (14af/14bf) is configured for suctioning and throwing the respective amount of bale filamentary material through the respective blower intake zone (14az/14bz) and for moving the respective amount of the bale filamentary material toward a corresponding blower output (14ao/14bo). One reason it is advantageous for the intake height to be smaller than the blower height is because material would be moved the opposite direction of what is desired if the top halves of the fans were exposed for material intake.

A delivery chute (15) is affixed relative to the chosen chamber wall (12a) and adjacent at least one of the blower outputs (14ao/14bo), and the delivery chute (15) extends to a release height above the bale chamber (12). The delivery chute (15) and the plurality of blowers (14a/14b), in turn, define a bale filament flow path there between. In the situation in which the delivery chute (15) is adjacent just of the blower outputs (14ao/14bo), as is the case in FIGS. 1-6, such a layout may nominally be considered as a side blower configuration. It is to be understood that while the delivery chute (15) is shown in this embodiment to be adjacent the forward-most of the two blower outputs (14ao/14bo), as shown in FIGS. 1-5, it could instead be adjacent the rearward most of the two in the manner illustrated in FIG. 6 (requiring, of course, an opposite spin of the blowers (14a/14b) needed in the forward placement scenario for the delivery chute (15)).

The first blower (14a) has a first diameter (14ad), the second blower (14b) has a second diameter (14bd), which are not necessarily equal. The chosen chamber wall (12a) extends between a pair of other chamber walls (12c/12d). The chosen chamber wall (12a) has a wall width (12aw), the wall width (12aw) being the distance of the pair of other chamber walls (12c/12d). Further, the first diameter (14ad) and the second diameter (14bd) together substantially approximate the wall width (12aw).

In the embodiment of FIGS. 1-6, the second blower (14b) is located between the first blower (14a) and the delivery chute (15). The first blower (14a) is configured to receive a first amount of the bale filamentary material through the corresponding blower intake zone (14az) and to deliver, through the corresponding blower output (14ao) thereof, the first amount of the bale filamentary material to the second blower (14b). In order to achieve this function, the first blower (14a), in this embodiment, is configured to rotate in a manner so as to move the bale filamentary material toward the second blower (14b).

The second blower (14b) is configured to receive a second amount of the bale filamentary material through a corresponding blower intake zone (14bz). The second blower (14b) is further configured to deliver both the second amount of the bale filamentary material and the first amount of the bale filamentary material to the delivery chute (15). In this embodiment, the first blower (14a) and the second blower (14b) are arranged to rotate in a same direction.

Figure 3:
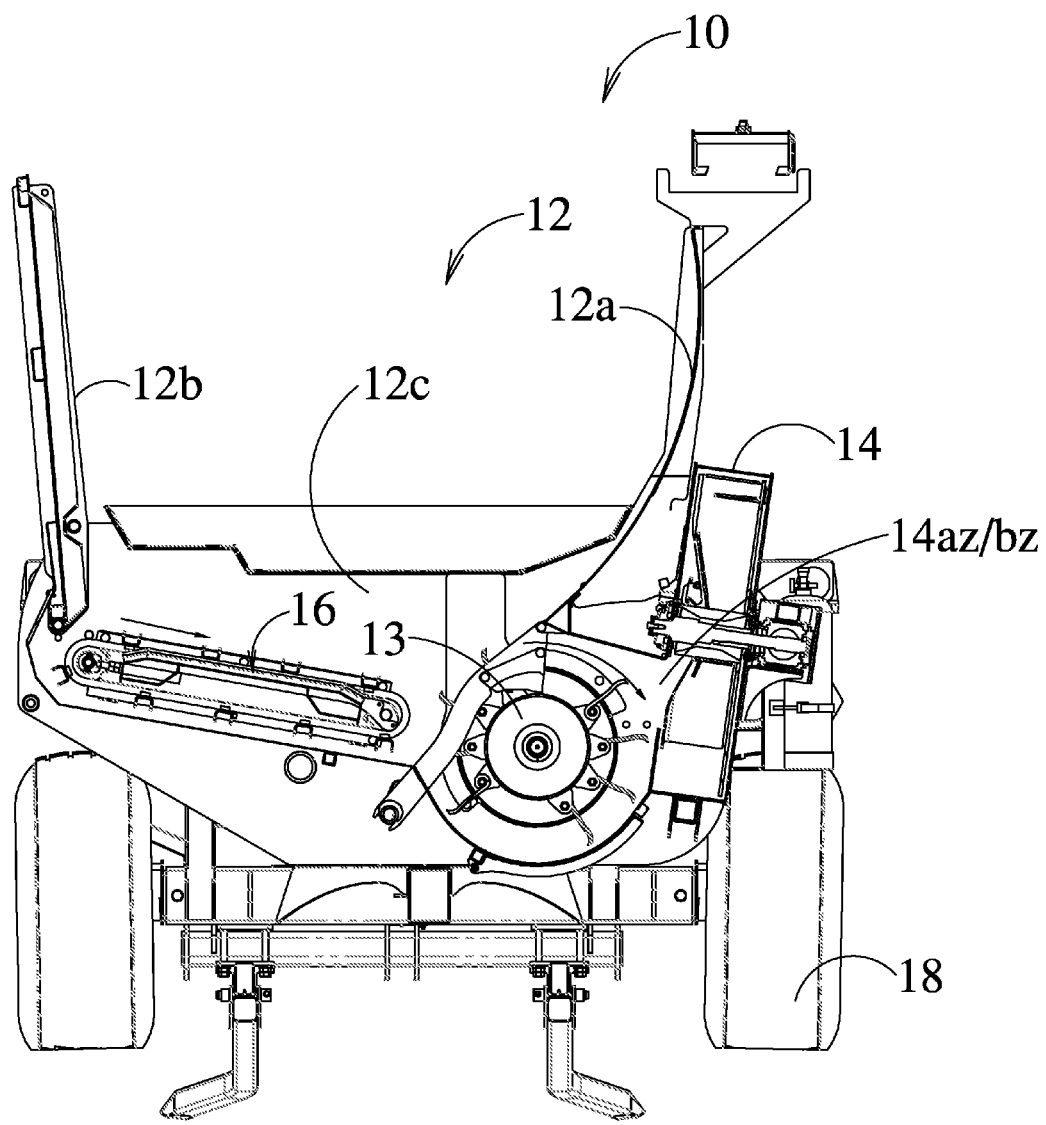
FIG. 3 is a cross sectional view looking from the front of the bale processor and looking rearwardly, showing a chain conveyor that moves a bale towards a rotating drum shredder with flails that tear off and throw bale filaments into the blower intake zone.
Figure 4:
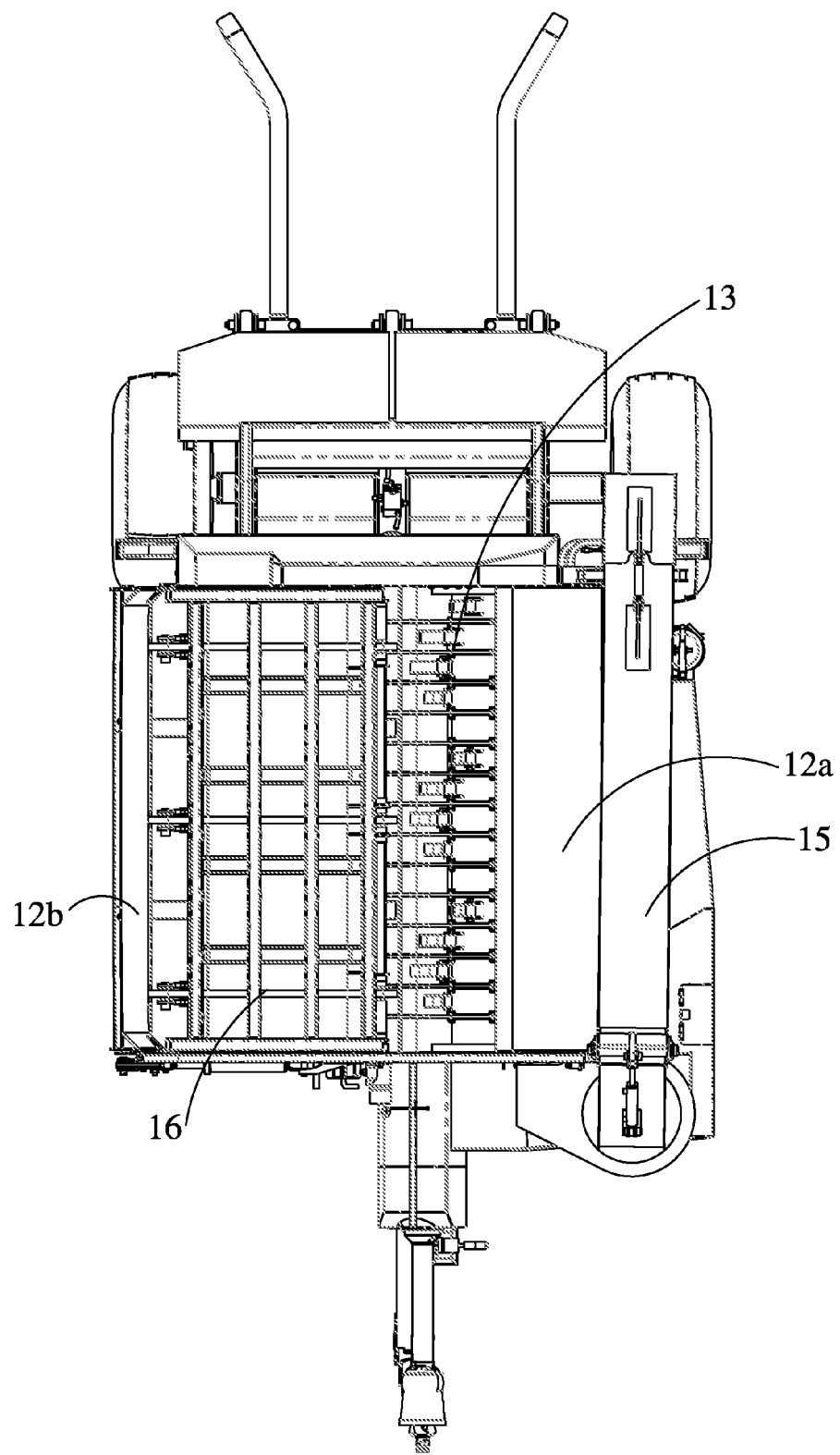
FIG. 4 is a top view showing the chain conveyor, shredder and the top of the delivery chute, the blowers being disposed below the delivery chute.
Figure 5:
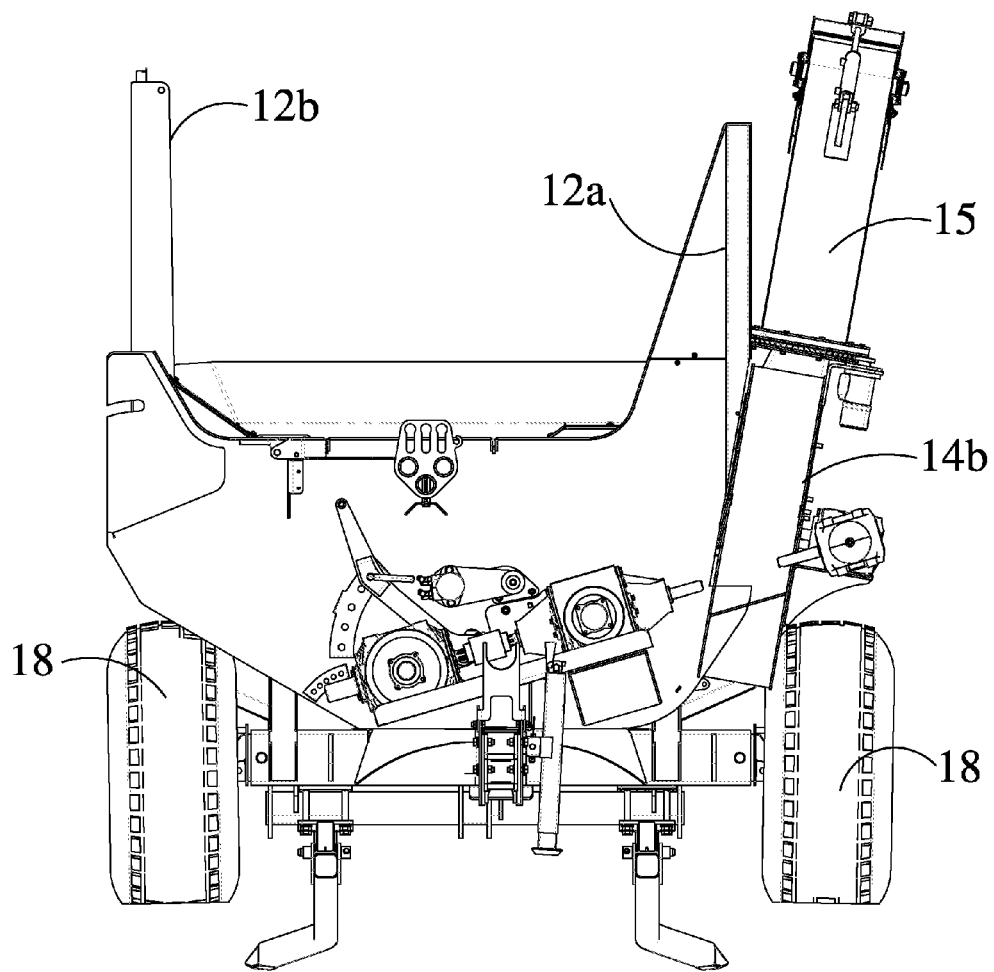
FIG. 5 is a front view of the bale processor of FIG. 1.
Figure 6:
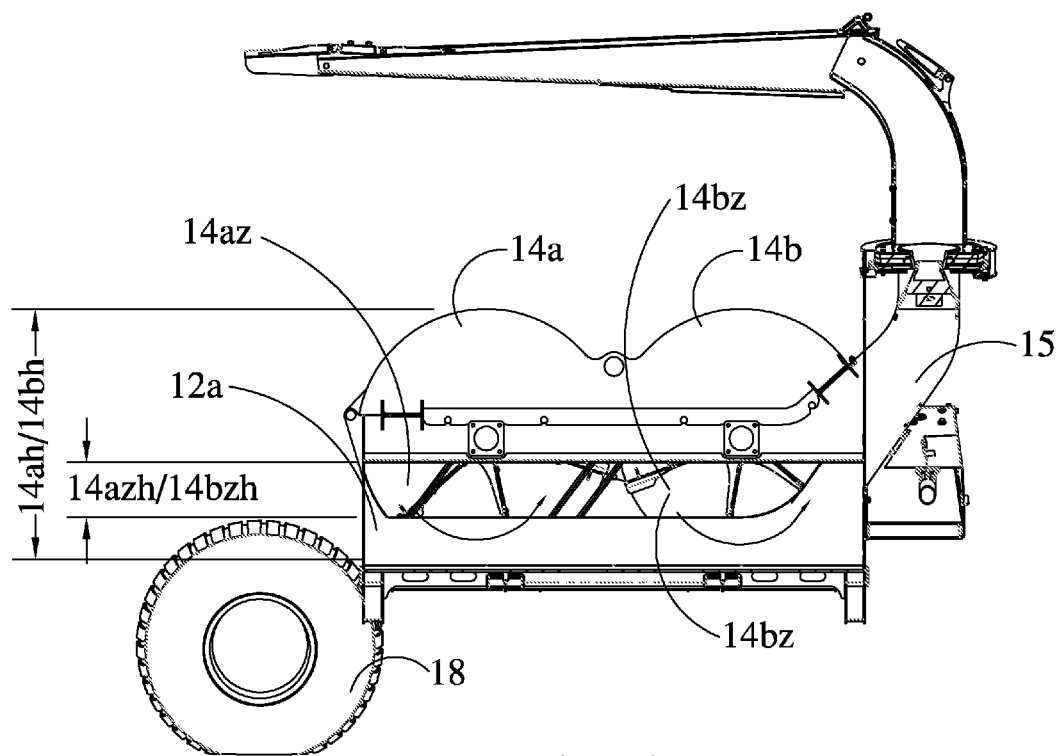
FIG. 6 is a partial cross sectional view from the inside of the bale chamber looking out towards the blowers and showing the intake portion of the blowers.

Looking to FIG. 3 it can be seen that, in operation, as a bale (not shown) resting on chain conveyor (16) is moved towards the shredder (13), the shredder (13) tears off pieces of the bale and throws the pieces through the openings 14az and 14bz. From there the rotating fan blades (14af/14bf), shown best in FIG. 2, move the bale fragments forwardly and up out through the delivery chute (15).

In an alternate embodiment shown in FIGS. 7-11, a delivery chute (115) is located between the first blower (114a) and the second blower (114b). This general layout may nominally be considered as a central blower configuration. The first blower (114a) and the second blower (114b) are both configured for delivering a corresponding amount of the bale filamentary material directly to the delivery chute (115). In this arrangement, the first blower (114a) and the second blower (114b) are configured to rotate in opposing directions, the first blower (114a) rotating counterclockwise and the other one (114b) rotating clockwise as shown in FIG.

8, for example, in order for both to move bale filamentary material toward the delivery chute (115). Ideally, the respective blower fans (114*af*/114*bf*) of the first blower (114*a*) and the second blower (114*b*) are disposed within about 4 inches of one another, but other separation distances may be chosen, in light of other design requirements, if needed.

In both of the aforementioned embodiments, the bale shredder (13/113) extends adjacent the corresponding blower intake zones (14*az*/114*az*/14*bz*/114*bz*) of the respective blowers (14*a*/14*b*/114*a*/114*b*) and the corresponding blower intake zones (14*az*/114*az*/14*bz*/114*bz*) of the respective blowers are coextensive.

Attention is directed to the drawings to show that each blower (14*a*/14*b*/114*a*/114*b*) has a respective blower diameter (14*ad*/114*ad*/14*bd*/114*bd*), and that preferably (but not required) the corresponding blower intake zone height (14*azh*/114*azh*/14*bzh*/114*bzh*) of the respective blowers (14*a*/114*a*/14*b*/114*b*) is about ⅓ of the respective blower diameter (14*ad*/114*ad*/14*bd*/114*bd*) or less.

Each blower (14*a*/114*a*/14*b*/114*b*) has a respective blower diameter (14*ad*/114*ad*/14*bd*/114*bd*) being about 3 feet across (though one blower could be larger than the other one if desired) and the respective intake zones (14*az*/114*az*/14*bz*/114*bz*) of the corresponding blowers (14*a*/114*a*/14*b*/114*b*) preferably (but not required) have a respective intake zone height (14*azh*/114*azh*/14*bzh*/114*bzh*) that is greater than about 4 inches but less than about 14 inches. Some of balancing factors in this decision are maintaining a sufficient flow of bale filamentary material into the delivery chute, minimizing blowback of the bale filamentary material, and achieving a desirable suction level by the blower fans (14*af*/14*bf*).

In both embodiments, a set of wheels (18/118) is mounted to the frame (11/111) (FIG. 2) and a tow hitch (17/117), thereby making the bale processor (10/100) a trailer implement. Advantageously, the placement of the wheels (18/118) and the size of the frame (11), among other features of the construction, are all chosen so that the trailer implement ultimately has a street-legal width.

It is to be understood that while a front/top (15) and middle/top (115) delivery chute is shown in the drawings, it is within the inventive concept (shown in later figures) to use a side delivery chute mounted to a lower side of the bale chamber and configure it for directing the bale filamentary material from the bale shredder out a side opposite to that where the plurality of blowers is located. In this arrangement, one of the delivery chutes and/or the side delivery chute can be selected for delivery of the bale filamentary material.

Figure 7:
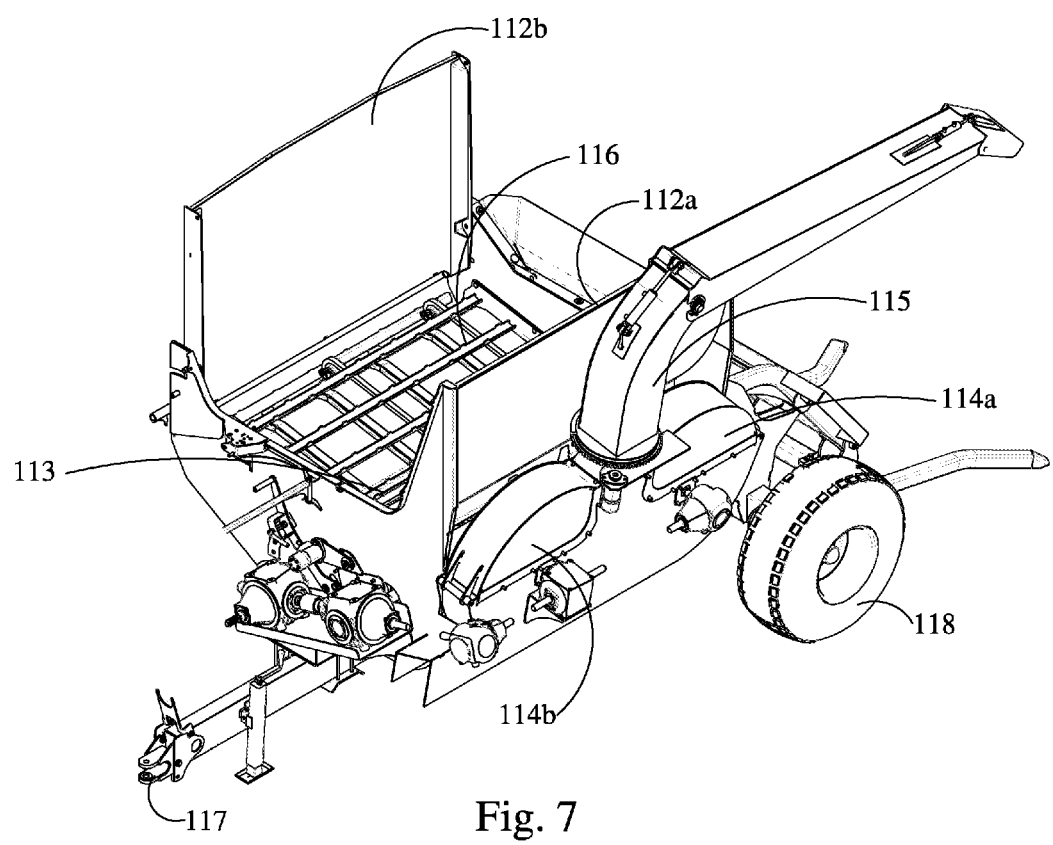
FIG. 7 is a perspective view of another embodiment of the present invention having a delivery chute connected to a place between two blowers.
Figure 8:
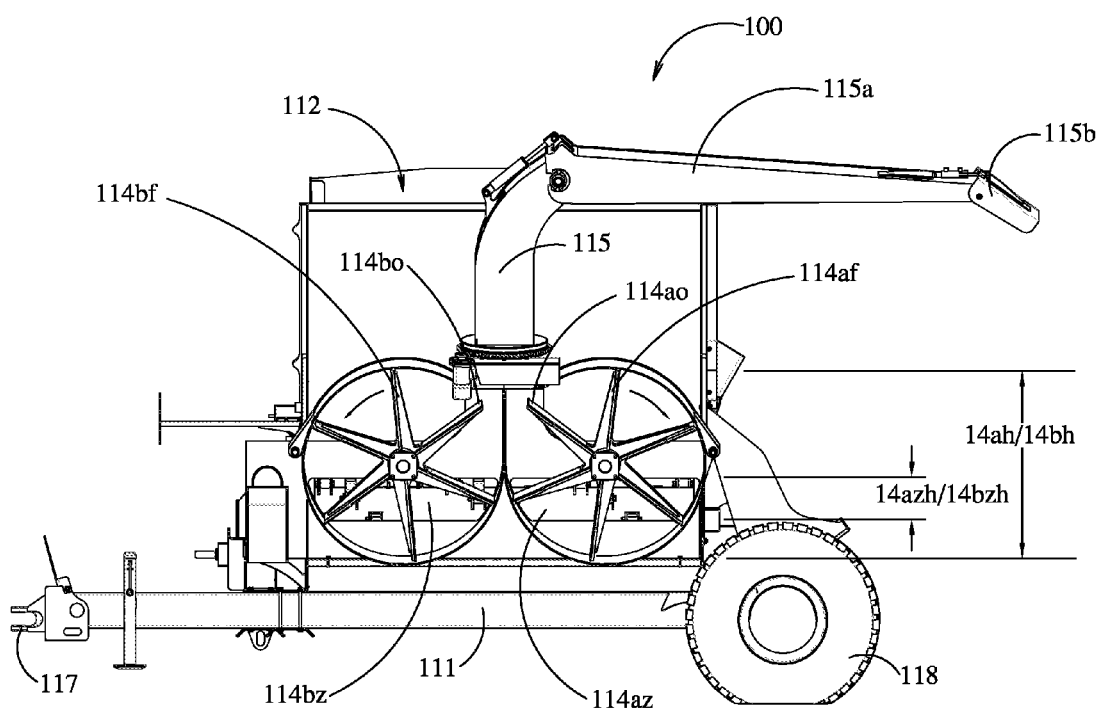
FIG. 8 is a view of the FIG. 7 embodiment with the structure removed on the left side to show the blowers and the intake section thereof.
Figure 9:
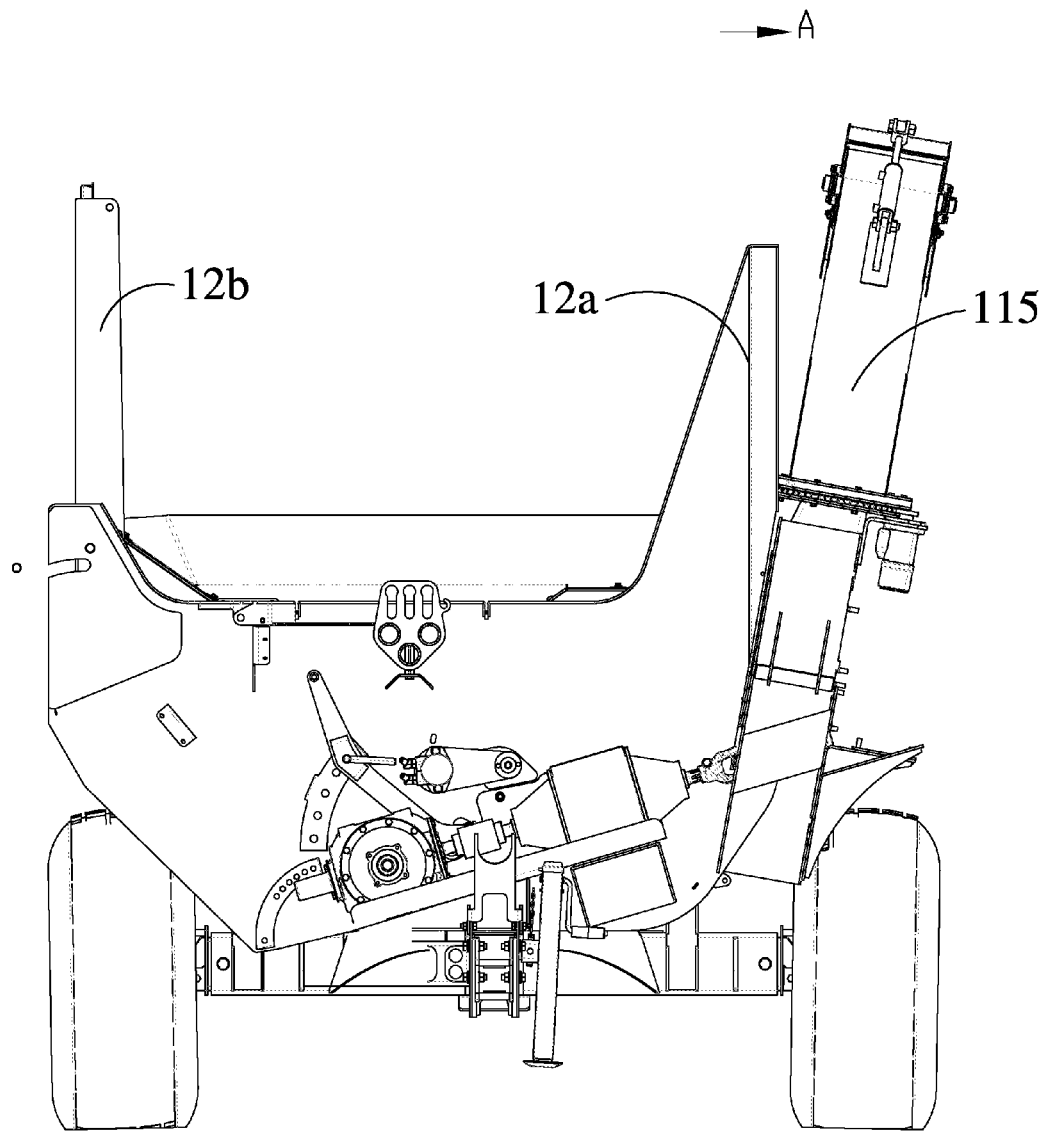
FIG. 9 is a front view of the bale processor of FIG. 7.
Figure 10:
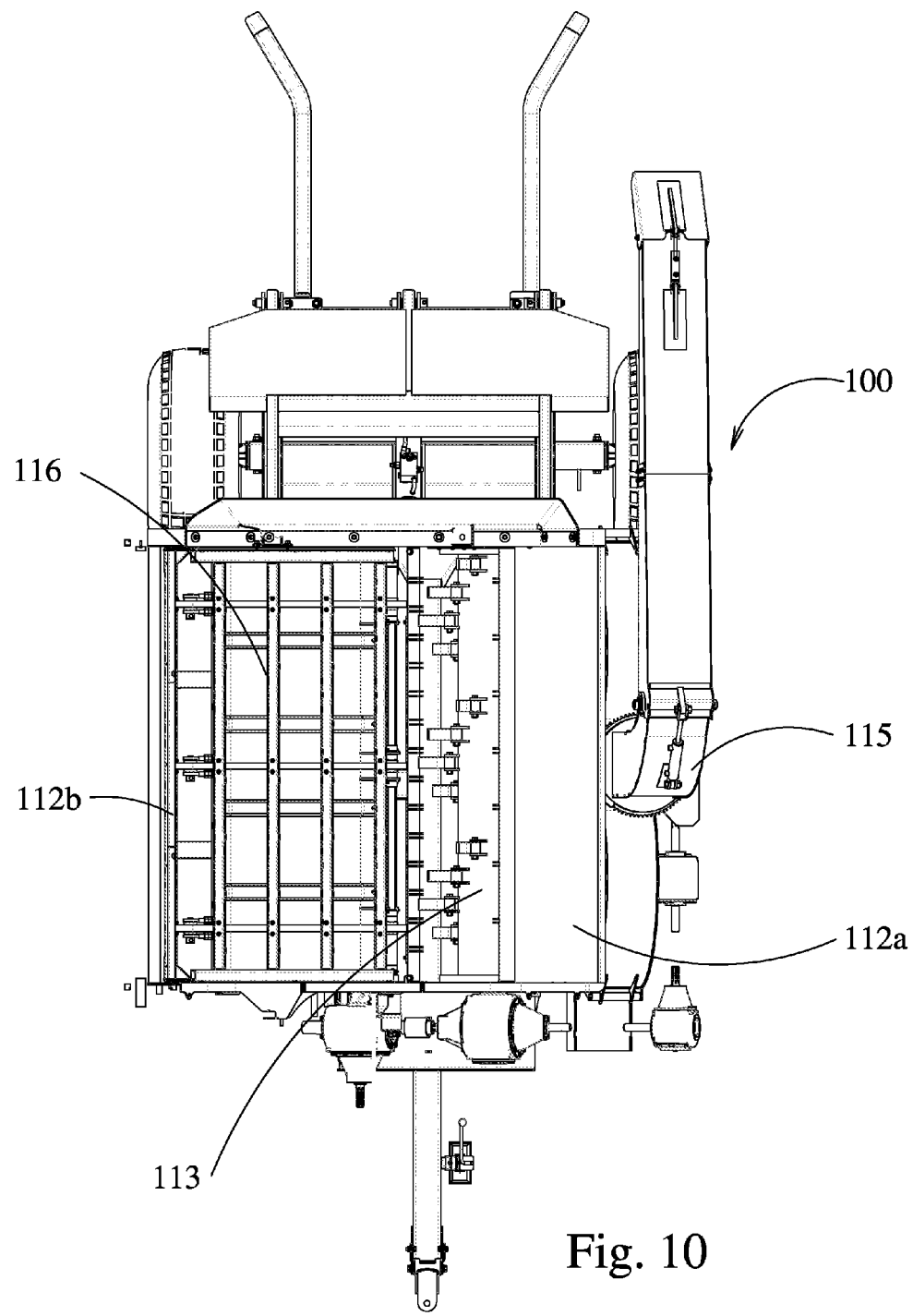
FIG. 10 is a top view showing the chain conveyor, shredder and the delivery chute extending upwardly from between the two blowers.
Figure 11:
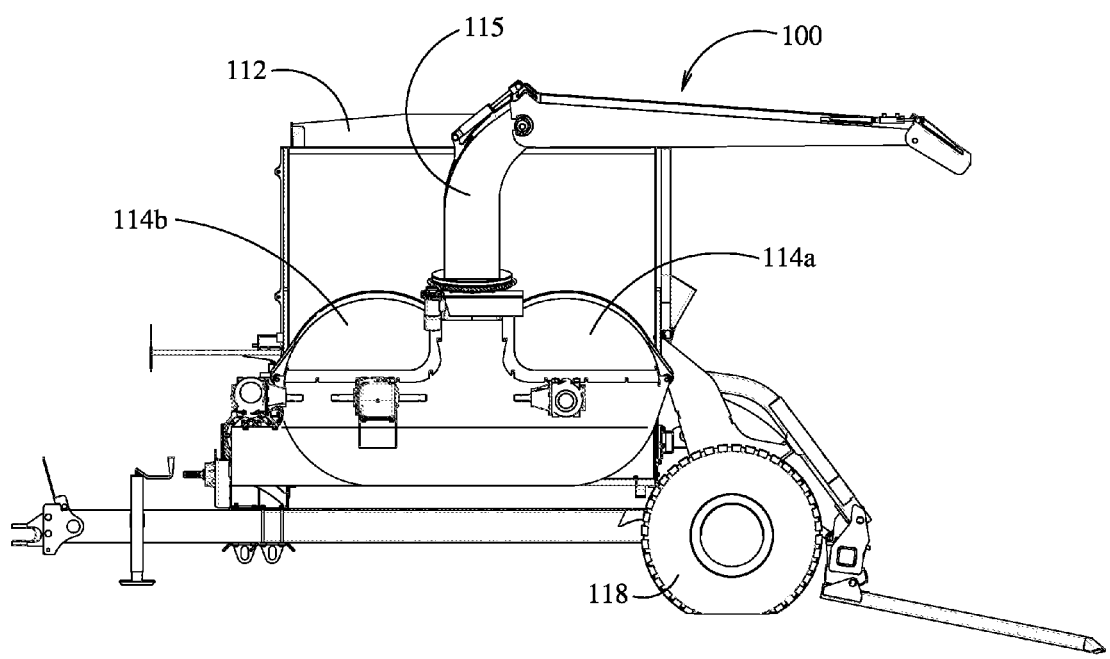
FIG. 11 is a right side view of the FIG. 7 bale processor, showing the two blowers, the inlet section to the two blowers being shown in dashed lines.

In operation of the embodiment of FIGS. 7-11, looking to FIG. 7 specifically, it can be seen that as a bale (not shown) resting on the chain conveyor (116) is moved towards the shredder (113), the shredder (113) tears off pieces of the bale and throws the pieces through the openings 114*az* and 114*bz*, as shown in FIG. 8. From there the rotating fan blades (114*af*/114*bf*), shown best in FIG. 8, move the bale fragments forwardly and up out through the delivery chute (115).

Figure 12:
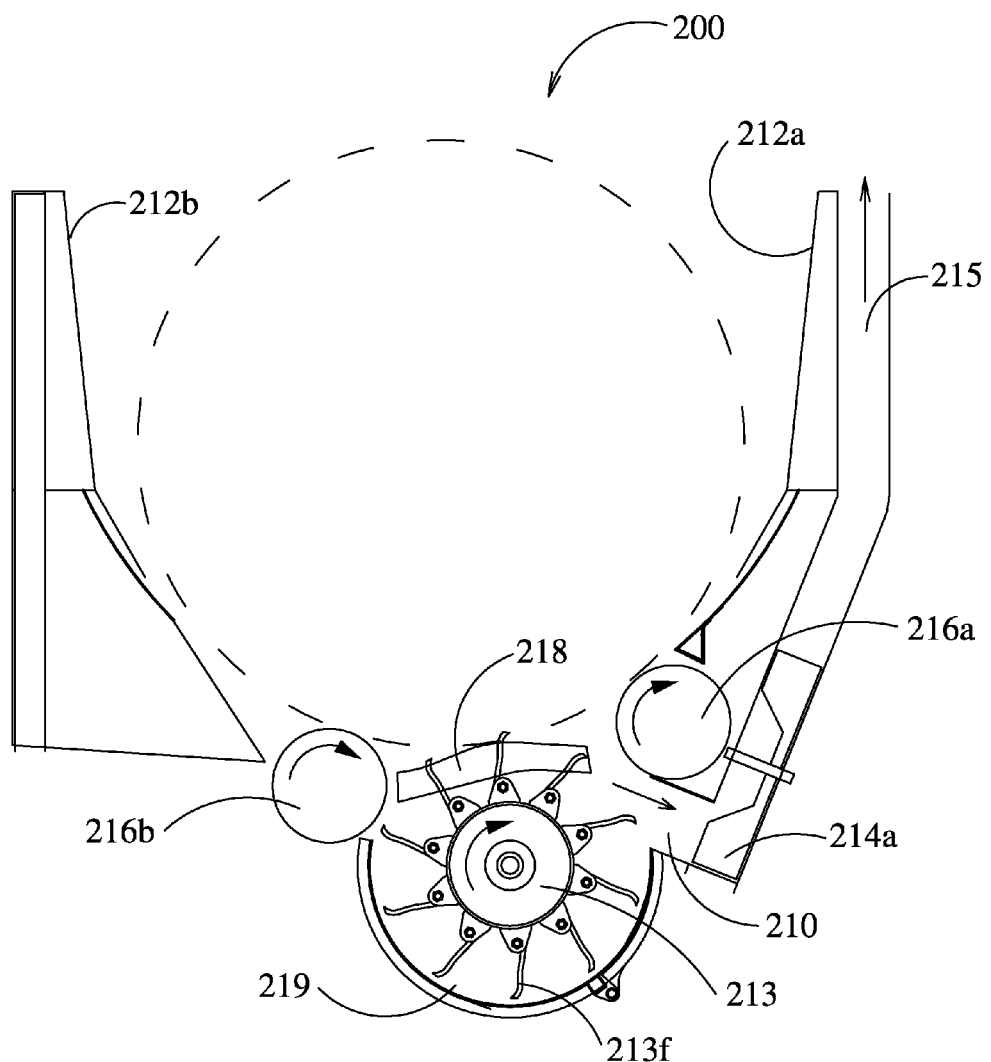
FIG. 12 is a schematic cross sectional view of a third embodiment showing a bale in dashed lines disposed in a chamber, with a double fan blower and delivery chute shown schematically, with the main difference from the FIGS. 1-11 embodiments being that instead of a chain conveyor, two rollers are used to support and rotate the bale in the bale chamber.

Referring now to FIG. 12, a schematic cross sectional view of another embodiment (200) shows a bale in dashed lines disposed in a chamber between walls (212*a*/212*b*) with a fan blower (214*a*) and delivery chute (215*a*). The main difference from the FIGS. 1-11 embodiments is that, instead of a chain conveyor (16/116), two rollers (216*a*/216*b*) are used to support and rotate the bale in the bale chamber. As such, the outside portion of the bale on adjustable slug bars (218) is exposed to rotating flails (213*f*) of a shredder rotor (213). This two roller arrangement is shown in more detail in PCT/US11/58514 filed Oct. 31, 2011, which is incorporated herein by reference in its entirety.

In the embodiment of FIG. 12, a shredder shielding (219) is provided adjacent the shredder (213). The shredder shielding (219) defines an exit port (210) below the roller (216*a*), where is the roller (216*a*) is proximate a double blower fan (214*a*), though this could be a single blower fan or one having any number of fans desired. Through this positioning of the exit port (210), the bale filamentary material (not shown) is thrown from the shredder (213) while in about the 12 o'clock to 3 o'clock position, relative to a clockwise rotation, traveling through the exit port (210) in order to reach a given blower fan (214*a*).

Further, to a greater degree than shown in FIGS. 1-11, a given blower fan (214*a*) is positioned at an angle in a range of approximately 10° to about 35° relative to the delivery chute (215*a*) (e.g., angled relative to the vertical). This angled positioning of the blower fan (214*a*) reduces the distance between the flail (214*f*) and at least a lower portion of a given blower fan (214*a*). This reduction in distance promotes the efficient transfer of the filamentary material (not shown) between the shredder (213) and the blower fan (214*a*). Angled placement of blower fan(s) helps make the system more compact, in addition to reducing the flail to fan distance. The benefits of this sort of angled positioning of the blower fan (214*a*) holds true for other embodiments, as well, whether single or multiple blower fans are employed.

Figure 13:
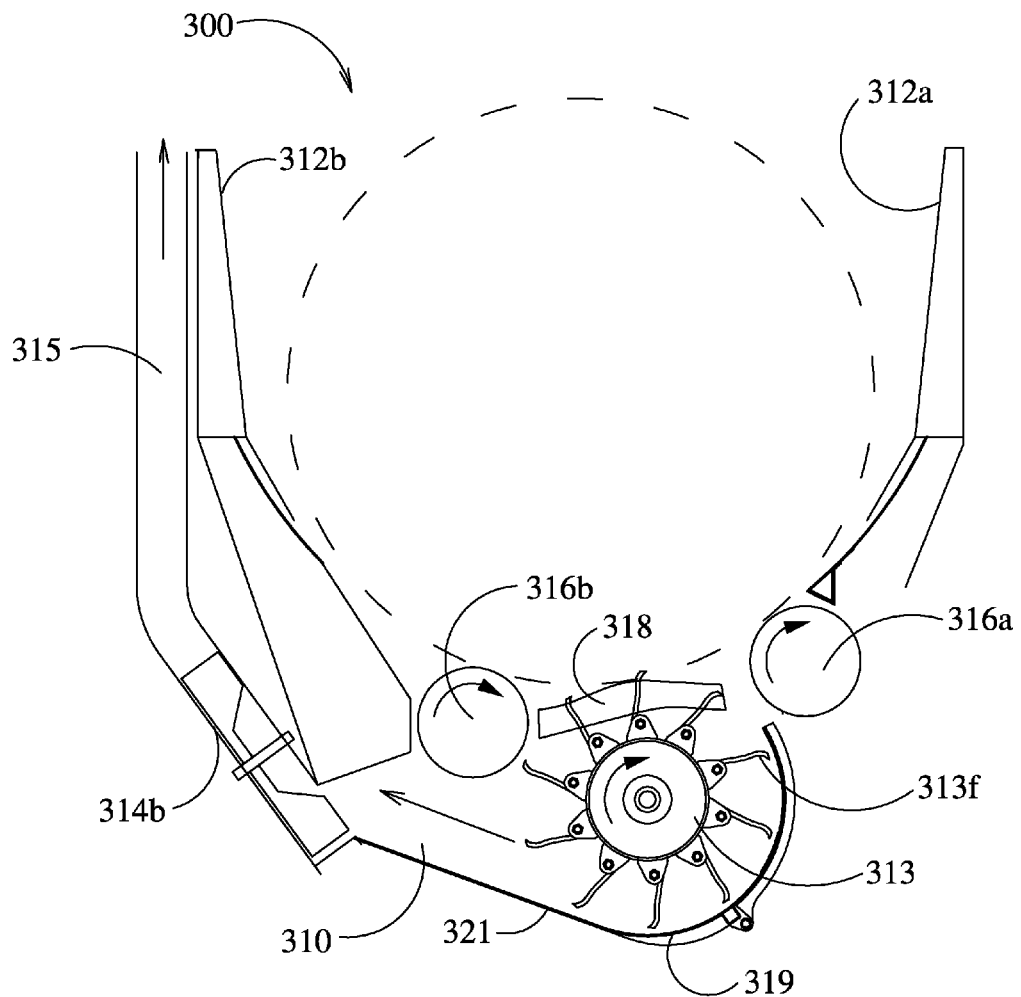
FIG. 13 is a schematic cross sectional view of a fourth embodiment like FIG. 12, except that the blowers are positioned at the side opposite that shown in the FIG. 12 embodiment.

FIG. 13 is a schematic cross sectional view of another embodiment, like FIG. 12 except that the illustrated blower (314*b*) is at the opposite side from that shown in the FIG. 12 embodiment. Two rollers (316*a*/316*b*) are used to support and rotate the bale supported on slug bars (318) in the bale chamber, so that the outside portion of the bale is exposed to rotating flails (313*f*) of a shredder (313).

In the embodiment of FIG. 13, a shredder shielding (319) is provided adjacent the shredder (313), and the shredder shielding (319) defines a sheet metal exit guide (321) below the roller (316*b*) and between the shredder (313) and a blower fan (314*b*). Through this positioning of the exit guide (321), the bale filamentary material (not shown) is thrown from the shredder (313), while in about the 6 o'clock to 9 o'clock position, relative to a clockwise rotation. The thrown bale filamentary material is then channeled via the exit guide (321) to reach a given blower fan (314*a*).

In FIG. 13 the filamentary material (not shown) is thrown upwardly by flails (313*f*) into the blower (314*b*) as contrasted from the way that flails (213*f*) in FIG. 12 throw the filamentary material (not shown) downwardly into blower (214*a*). In both instances the blowers (214*a*/314*b*) are placed closer to the flails (213*f*/313*f*) than if the blowers (214*a*/314*b*) were placed in a vertical wall as in the prior art. Such angled placement enhances the efficient transfer of the filamentary material from the respective flails (213*f*/313*f*) to the respective blowers (214*a*/314*b*).

Figure 14A:
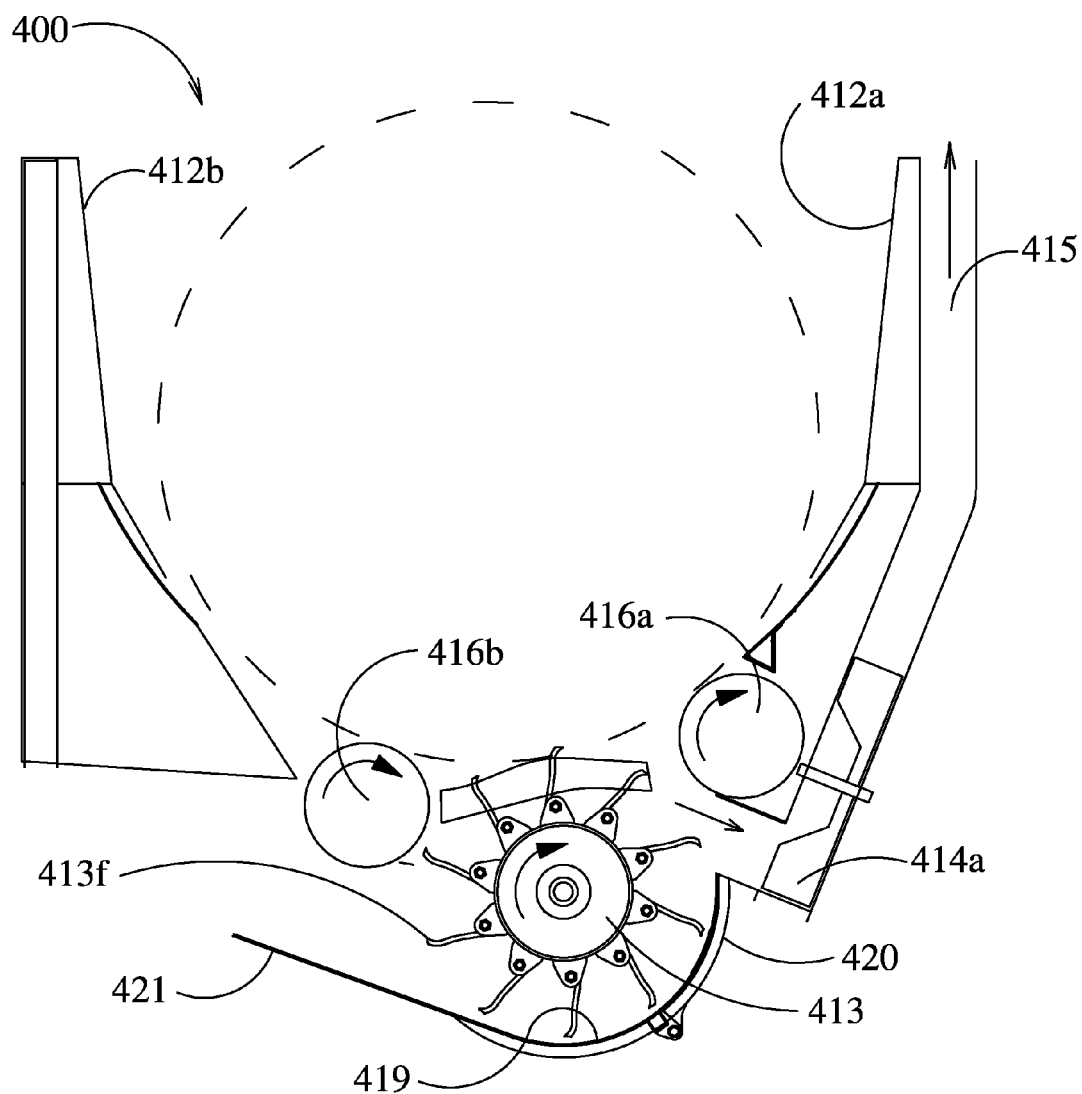
FIGS. 14A and 14B show cross sectional schematic views of anther embodiment having an arcuate shield that is positioned in one position in FIG. 14A to cause most of the filamentary matter to exit through the blower on the right side and to the left when the semi-circular shield is positioned in the position shown in FIG. 14B most of the filamentary matter is directed to the double blowers on the left side.
Figure 14B:
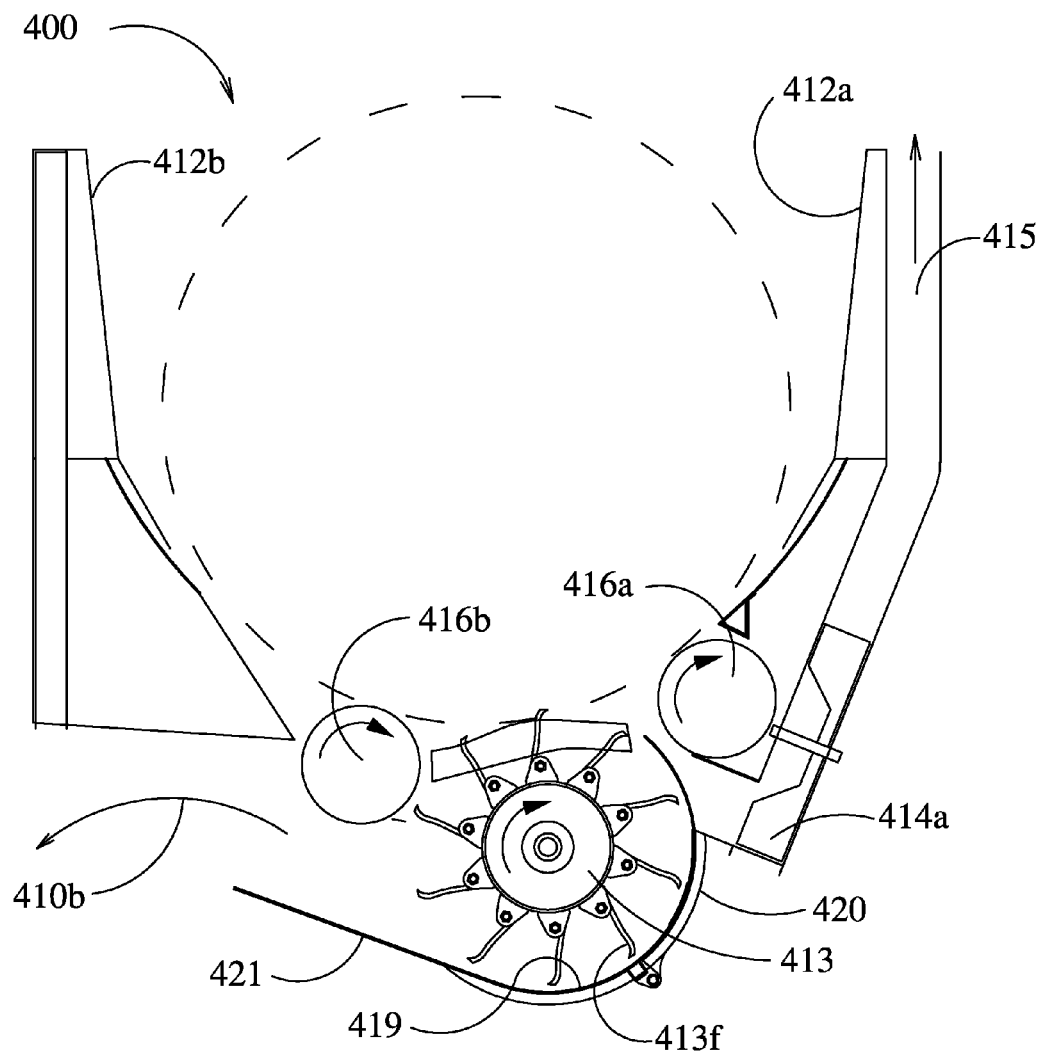

FIGS. 14A and 14B are cross sectional schematic views showing another embodiment (400). In this embodiment (400), a first blower or set of first blowers (414*a*) are shown to be on a first (e.g., right) side in FIG. 14A, while a side discharge zone or passageway (shown by arrow (410)) is defined at the bottom of the bale processor (400) in a region at least partially between the left/second bale processor wall and the flails (413*f*). Shredder shielding (419) further has a moveable arcuate shield member (420) slideably and rotatably fixed relative to an outer face thereof. When positioned as shown in FIG. 14A, the shield member (420) facilitates the selectable control of the flow of bale filamentary material mainly through the blower (414a) and chute (415) combination.

FIG. 14B shows a side discharge zone shown by arrow (410) above a guide member (421), which could be made of sheet metal, composite, plastic, etc., and includes a first arcuate guide portion under the rotor/shredder 413 and flat guide extension extending to one side of the shredder 413. The first arcuate guide portion under the shredder 413. The arcuate shield member (420) is positioned in FIG. 14B so as to cause most of the filamentary matter to exit through the blower(s) (414a) and chute (415) on the right side as shown in FIG. 14A. However, when the arcuate shield (420) is positioned in the position shown in FIG. 14B, thereby essentially blocking the pathway to the blower/chute combination, most of the filamentary matter is diverted directly out the bottom, left side of the bale processor (400), past the guide member (421), as shown by the arrow (410) due to the force of the flails (413f) of the rotor (413). The bale rotates by rollers (416a/416b) between walls (412a/412b). The arcuate shield (420) just slides in and is guided by a mating arcuate slot or other known guide mechanism (not shown) operatively attached to the frame.

Figure 15A:
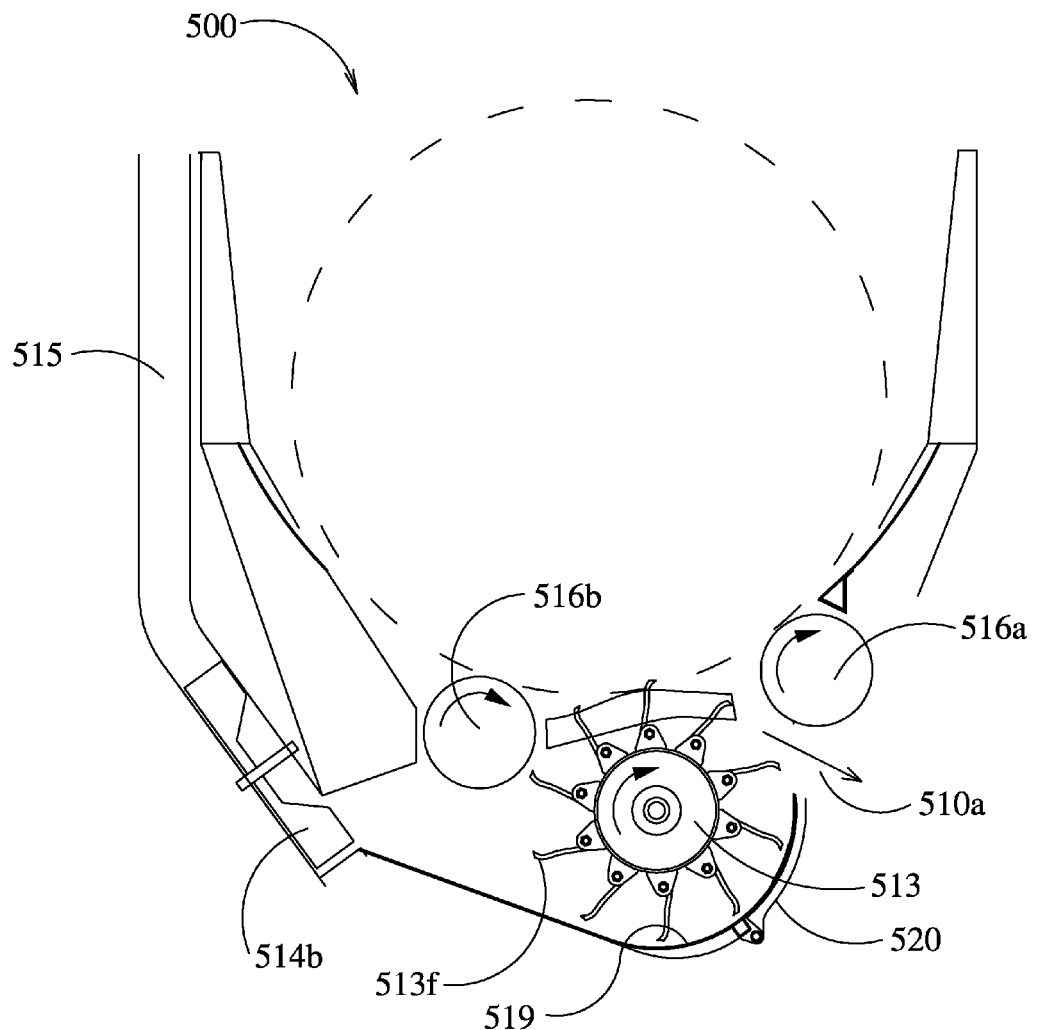
FIGS. 15A and 15B show schematic views of another embodiment that has a sliding shield so that in FIG. 15A most of the filamentary material exits the right side directly from the flails and in FIG. 15B most of the filamentary material exits through a blower on the left side and out a discharge chute.
Figure 15B:
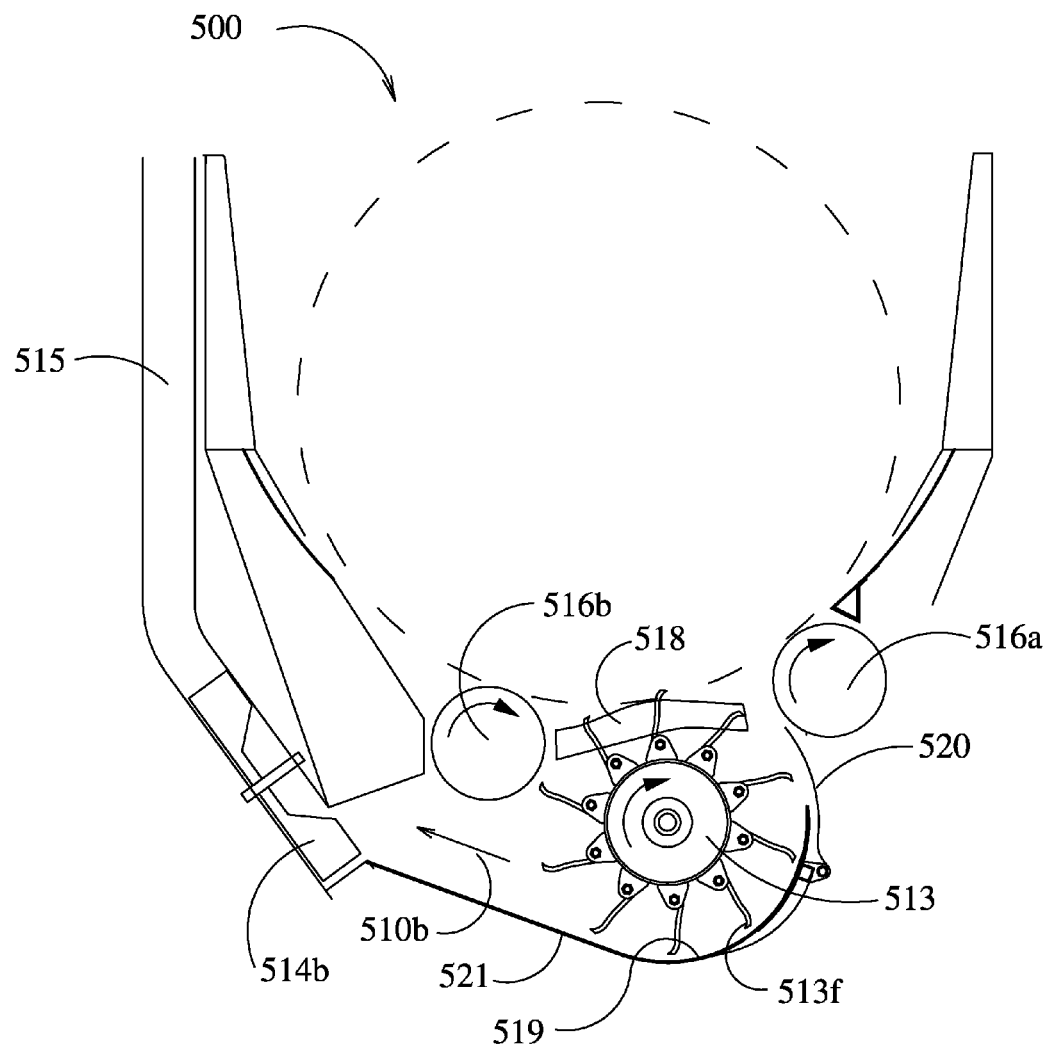

Looking now to FIGS. 15A and 15B, a sixth embodiment 500 has a sliding shield (520) and when that sliding shield (520) in the position of FIG. 15A, most of the filamentary material exits at a right side discharge zone (as indicated via arrow (510a)) directly from the flails (513f), and in FIG. 15B most of the filamentary material exits through at least one blower (514b) on the left side and out a discharge chute (515), when the sliding shield (520) is moved to the position shown in FIG. 15B.

Figure 16:
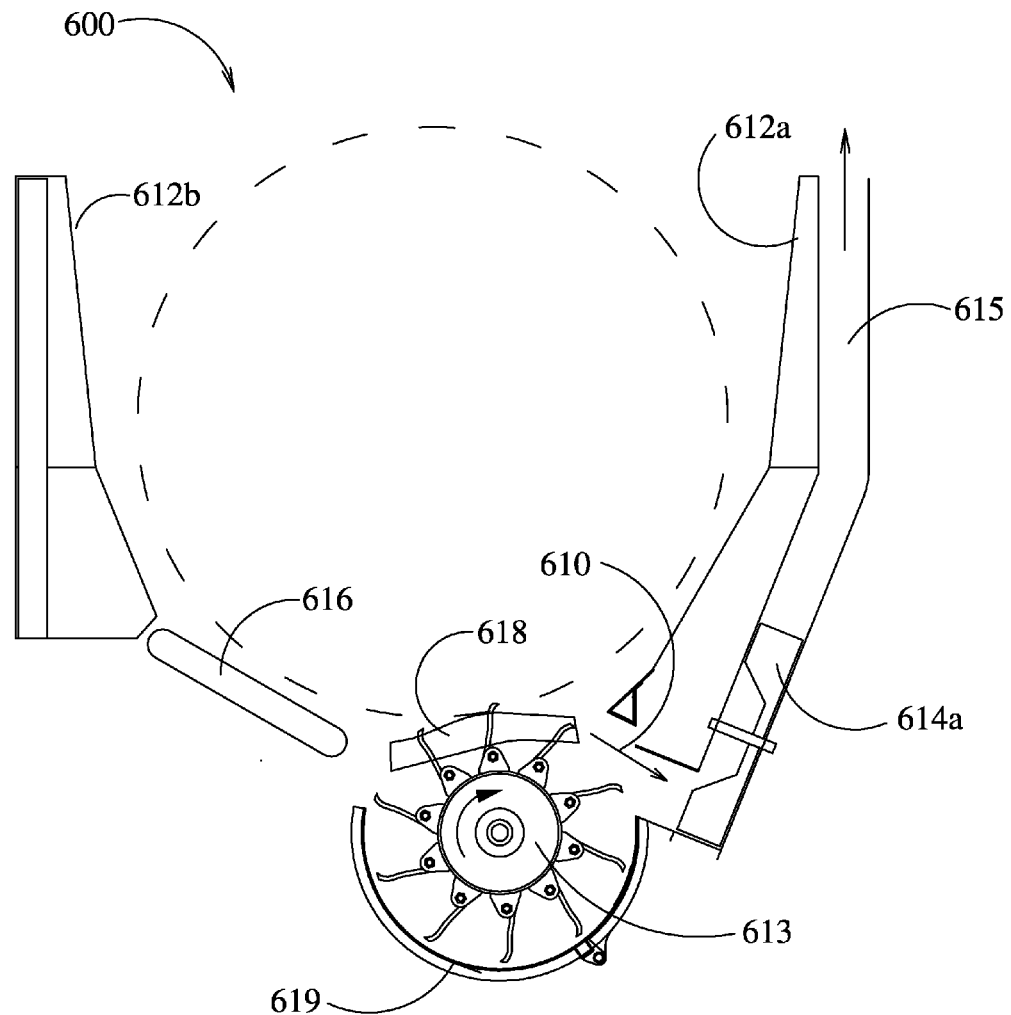
FIG. 16 is a schematic cross sectional view of another embodiment showing a bale in dashed lines disposed in a chamber, with a blower and delivery chute shown schematically, in which the main difference from the embodiment shown in FIG. 12 is that a chain conveyor is used instead of two rollers to support and rotate the bale in the bale chamber.

FIG. 16 is a schematic cross sectional view of a fifth embodiment (600), showing a bale in dashed lines disposed in a chamber with walls (612a/612b) with a fan blower (614a) and delivery chute (615). A chain conveyor (616) is used to support and rotate the bale on slug bars (618) in the bale chamber defined by the walls (612a/612b). By being supported and rotated in this manner, the outside portion of the bale is exposed to rotating flails (613f) of a shredder (613). The filamentary material (not shown) will exit out the side discharge zone, indicated by the arrow (610), directly from the shredder (613) to the blower (614a) and out the delivery chute (615).

Figure 17:
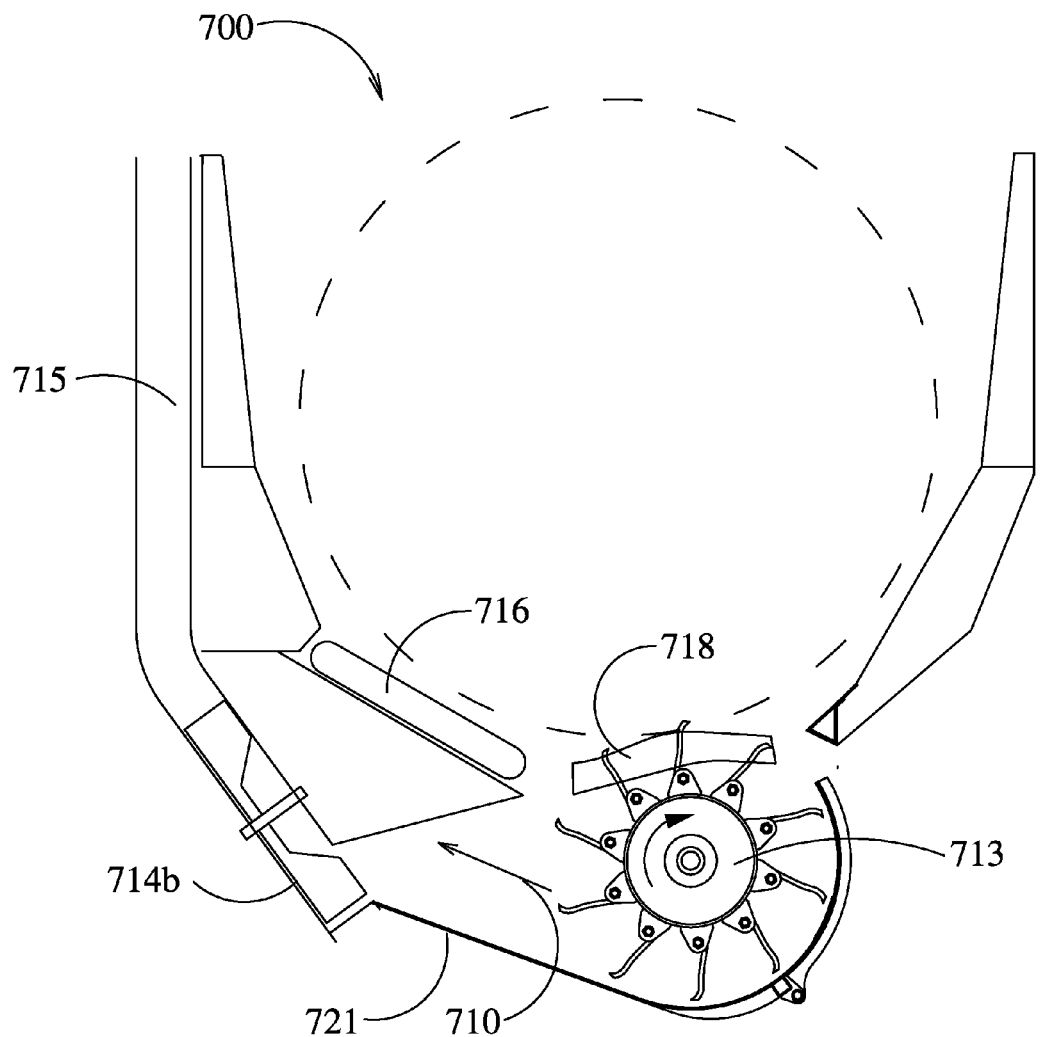
FIG. 17 is a schematic cross sectional view of another embodiment like FIG. 13, except that a chain conveyor, instead of a pair of rollers, is used to convey the bale to the shredder.

FIG. 17 is a schematic cross sectional view of a sixth embodiment 600, which is like FIG. 13, except that a chain conveyor (716) is used to support and rotate the bale on slug bars (718) in the bale chamber, instead of using conveying rollers (316a/316b). The outside portion of the bale is thereby exposed to rotating flails (713f) of a shredder (713) as the chain conveyor (716) moves the bale toward the shredder (713).

Figure 18A:
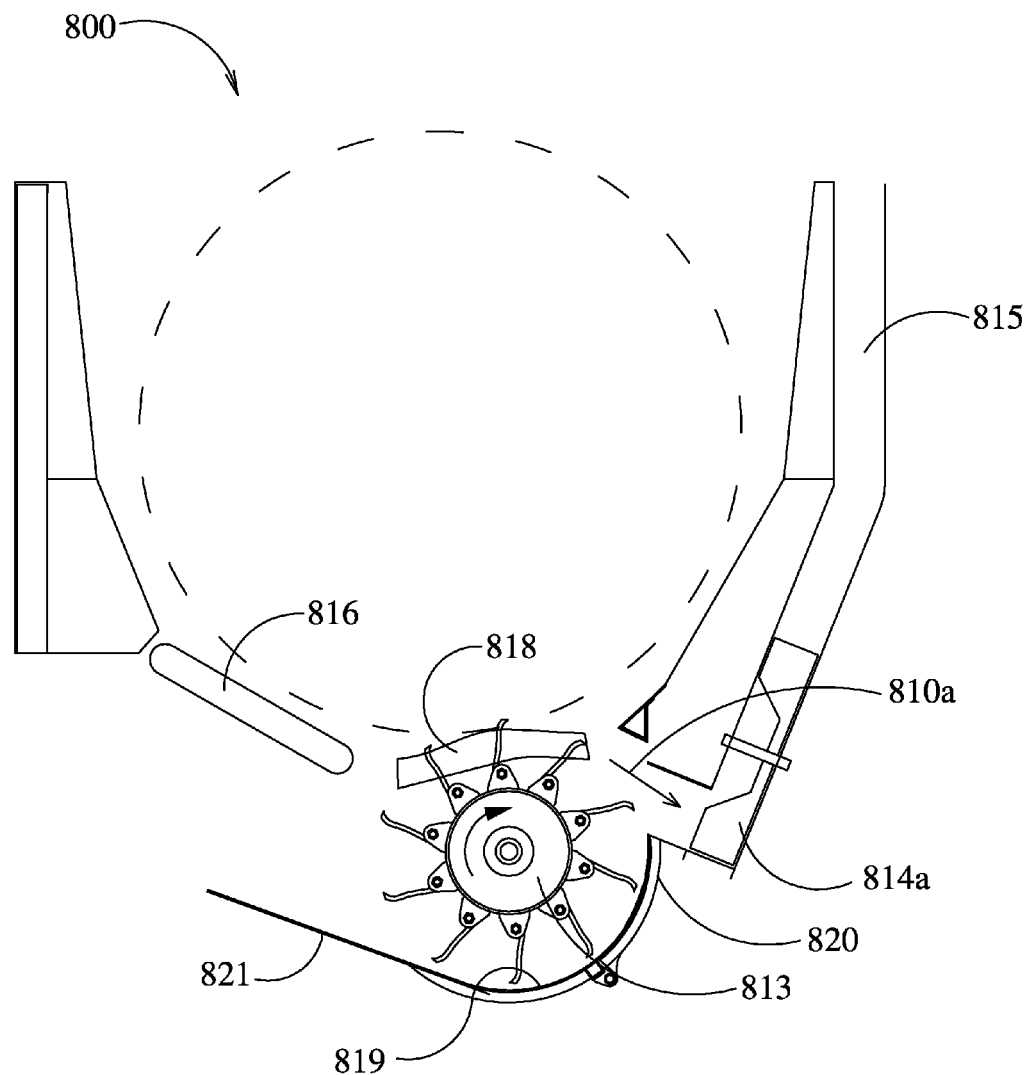
FIG. 18A is a cross sectional schematic view showing another embodiment, which is like FIG. 14A except that a chain conveyor, instead of rollers, is used as a bale conveyor.
Figure 18B:
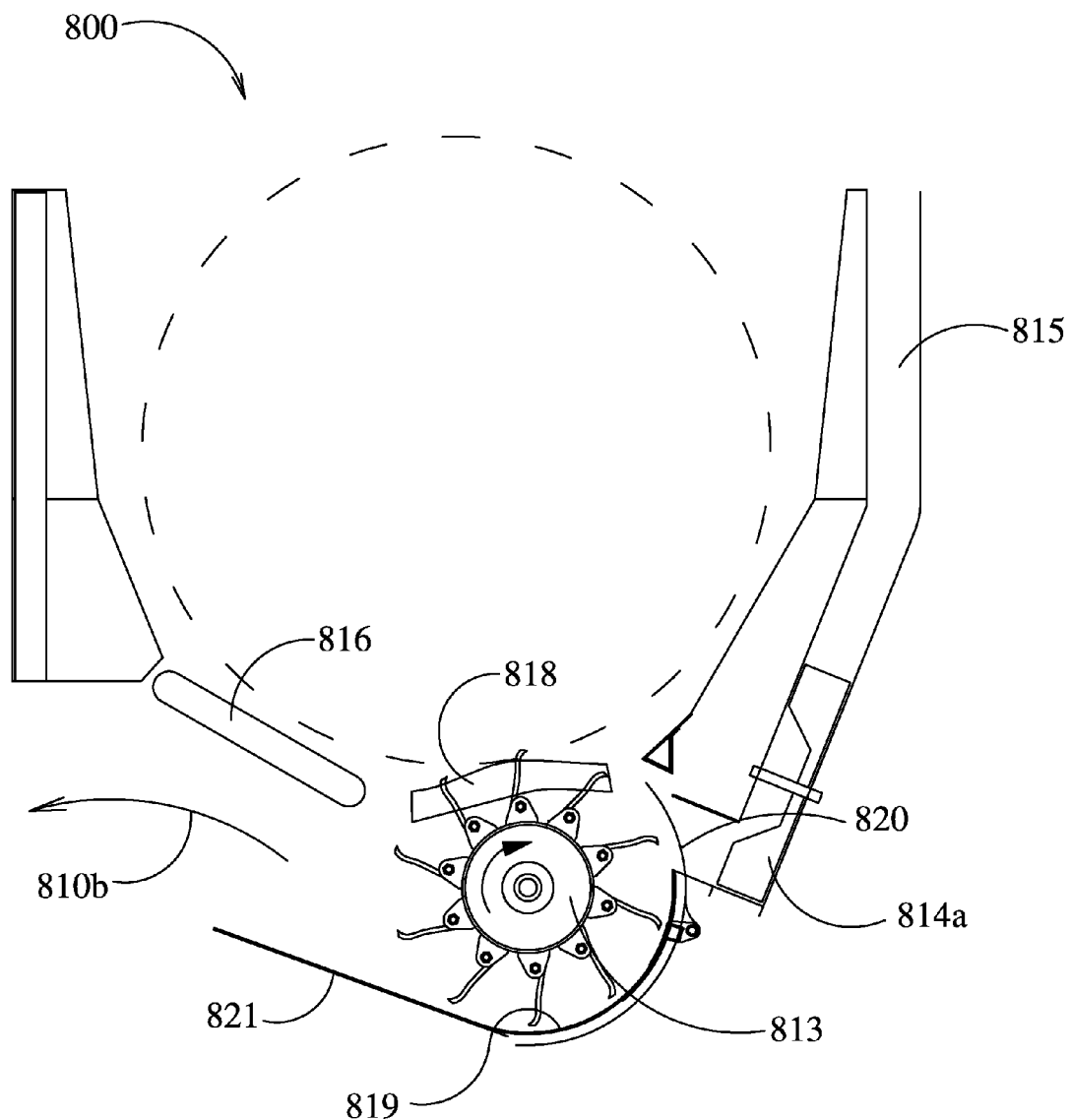
FIG. 18B is a cross sectional schematic view showing another embodiment, which is like FIG. 14B except that a chain conveyor is used in place of the rollers as the bale conveyor.

FIG. 18A is a cross sectional schematic view, showing an embodiment (800). An arcuate shield (820) is positioned in one position in FIG. 18A to cause most of the filamentary matter (not shown) to exit at arrow (810a) through the blowers (814a) on the right side as shown in FIG. 18A. But when the semi-circular shield (820) is positioned in the position shown in FIG. 18B all of the filamentary matter (not shown) is directed to the blowers (814b) on the left side as indicated by arrow (810b) over guide member (821) and includes a first arcuate guide portion under the rotor/shredder 813 and flat guide extension extending to one side of the shredder 813. As in the other embodiments described above, the bale rests on slug bars (818) in a bale chamber.

Figure 19A:
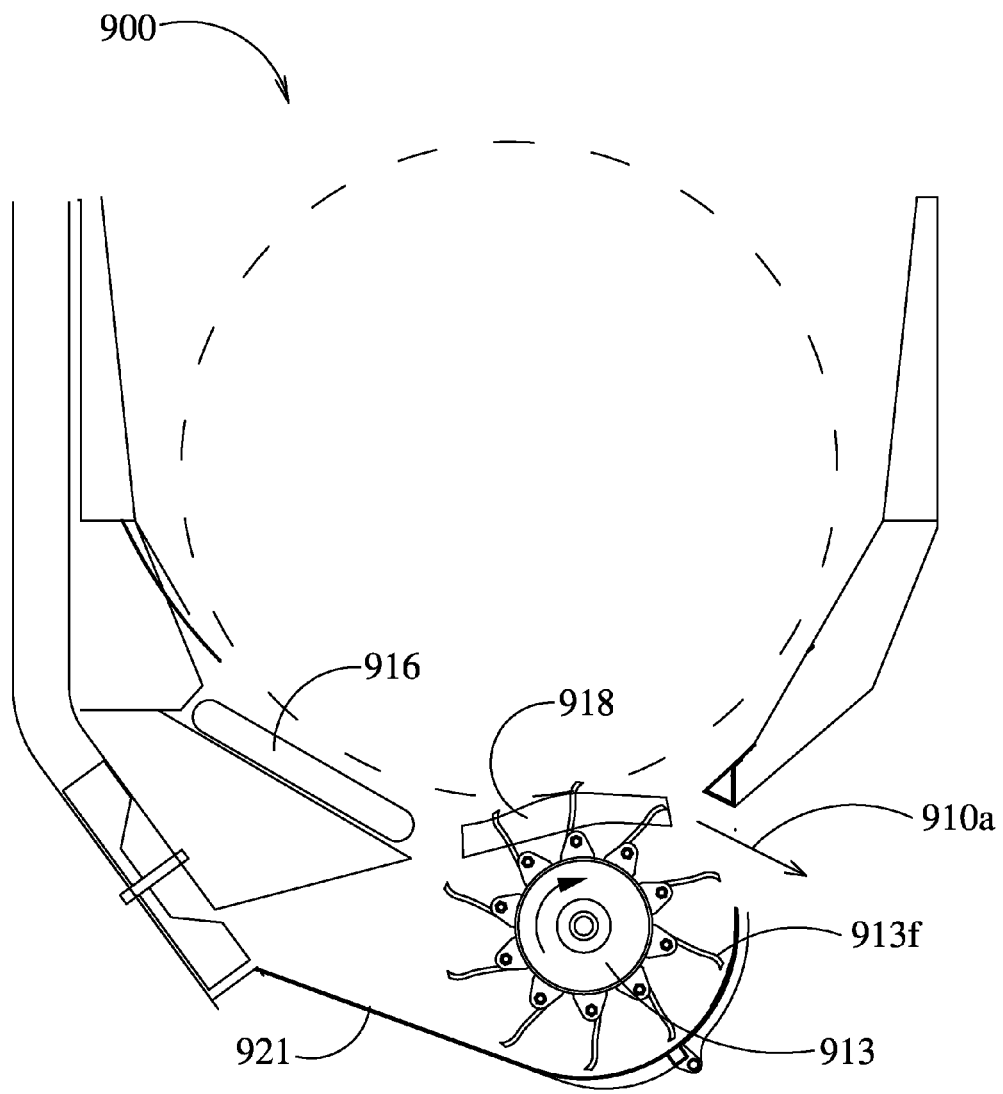
FIGS. 19A and 19B show cross sectional schematic views of a another embodiment which is like the FIGS. 15A and 15B embodiment, but uses a chain conveyor instead of roller conveyors.
Figure 19B:
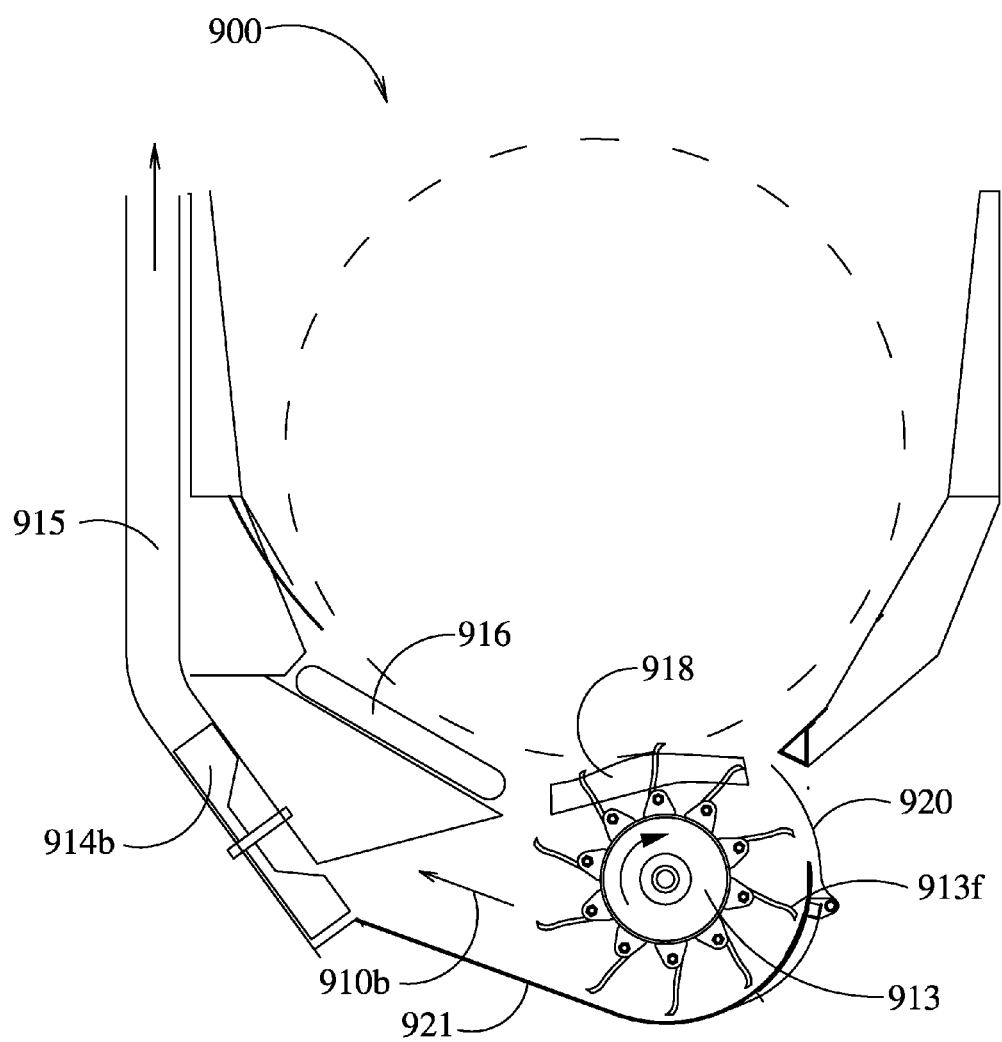

FIGS. 19A and 19B show cross sectional schematic views of a another embodiment (900), which is like the FIGS. 15A and 15B embodiment except that it uses a chain conveyor (916) instead of roller conveyors (516a/516b). Embodiment 900 has a rotatable movable sliding shield (920), and, when that sliding shield (920) in the position of FIG. 19A, most of the filamentary material exits the right side discharge zone (indicated at arrow (910a) directly from the flails (913f). Meanwhile, when the sliding shield is moved to the position shown in FIG. 19B, most of the filamentary material exits through a blower (914b) on the left side and out a discharge chute (915).

Figure 20A:
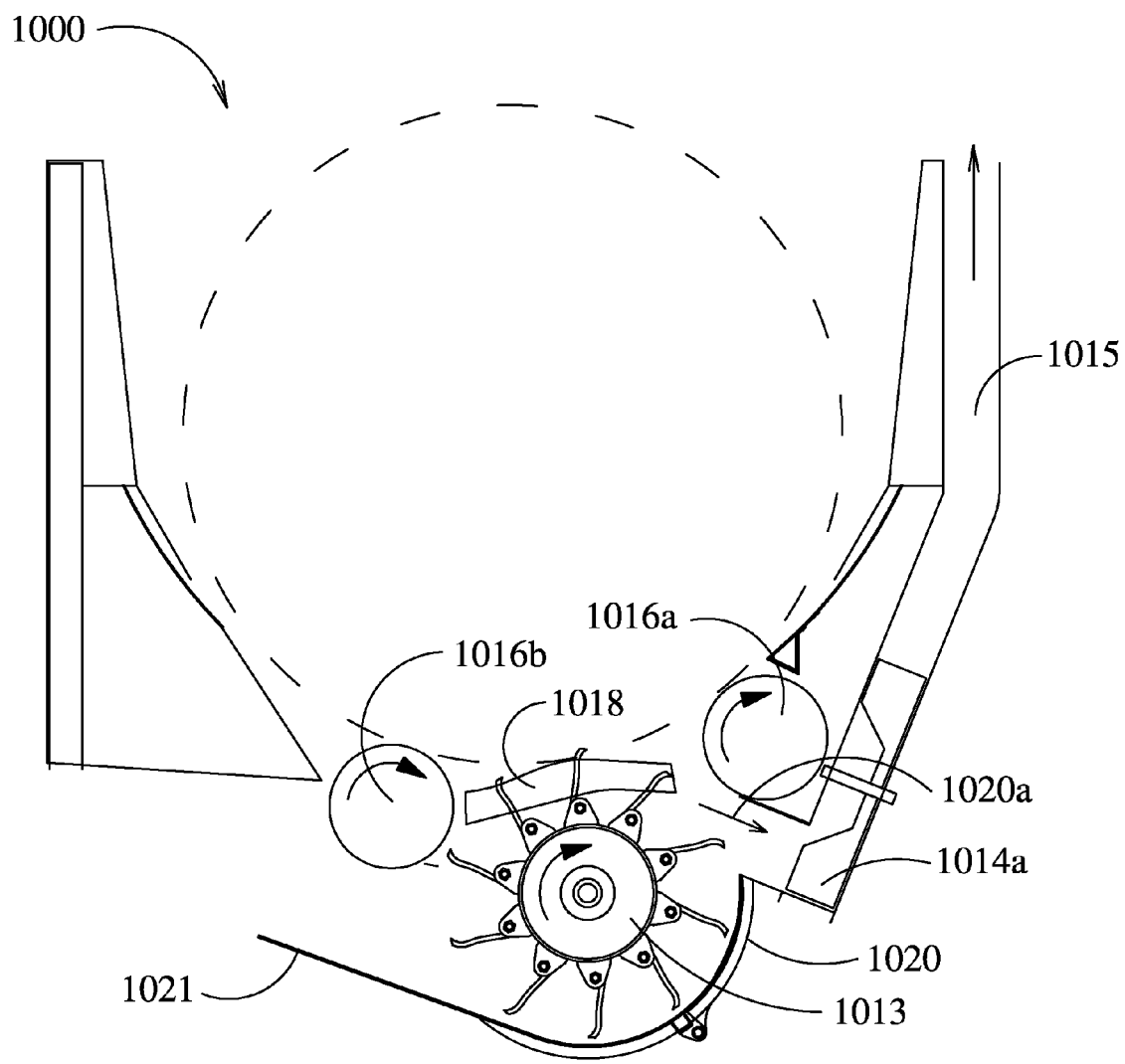
FIGS. 20A and 20B are schematic views of an embodiment identical to the FIGS. 14A and 14B embodiment, except that a material diverting shield is on the inside of a shroud around the shredder/rotor.
Figure 20B:
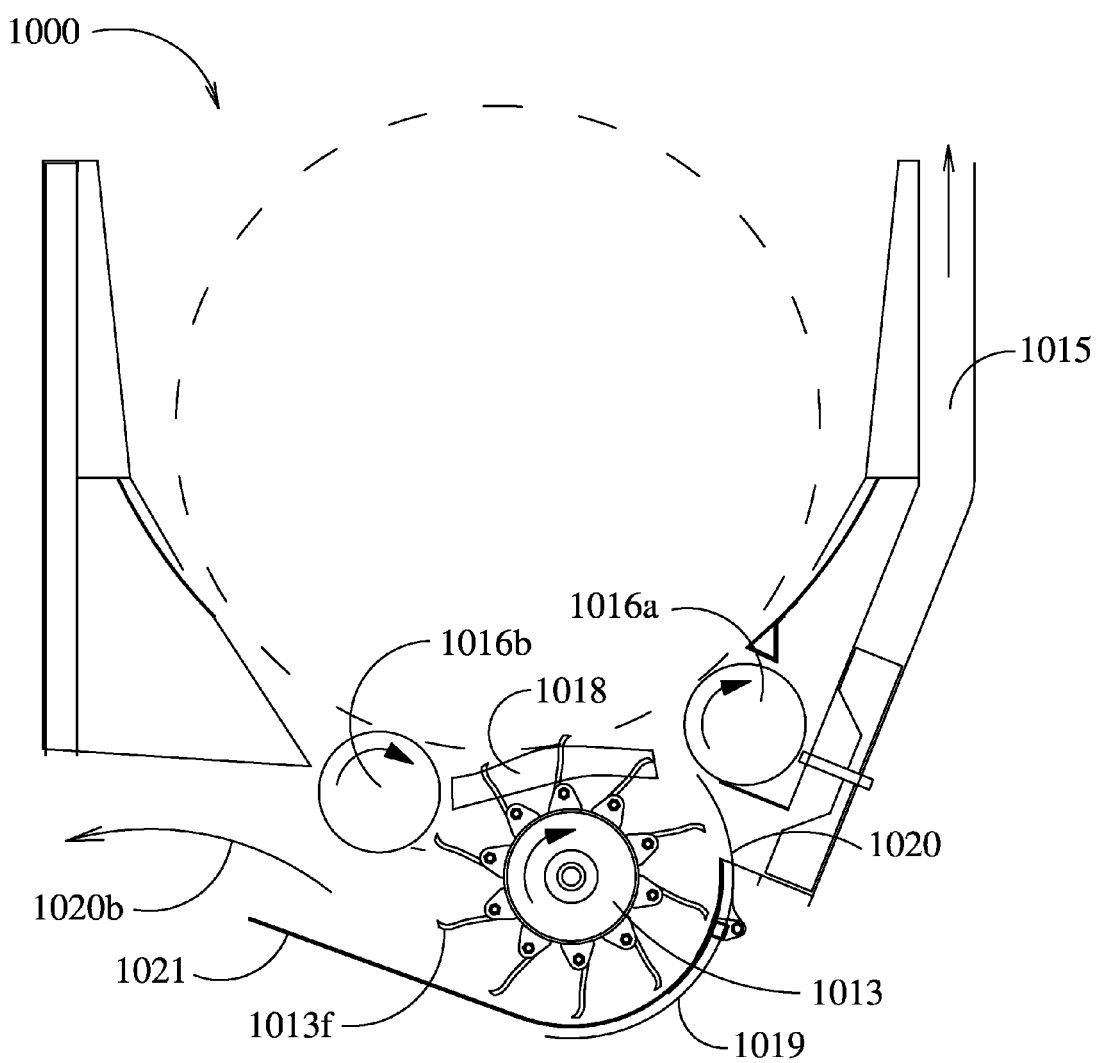

FIGS. 20A and 20B are schematic views of an embodiment identical to the FIGS. 14A and 14B embodiment except that a sliding shield for diverting material is on the inside of a shroud around the shredder/rotor. Accordingly, a first blower or set of first blowers (1014a) are shown to be on a first (e.g., right) side in FIG. 20A. A shredder shroud (1019) further has a moveable arcuate shield member (1020) rotatably fixed relative to an inner face thereof to facilitate the selectable control of the flow of bale filamentary material. When positioned as shown in FIG. 20A, the arcuate shield member (1020) allows the bale filamentary material to flow mainly through the blower (1014a) and chute (1015). FIG. 20B shows a side discharge zone shown by arrow (1020b) above a flow guide member (1021) and includes a first arcuate guide portion under the rotor/shredder 1013 and flat guide extension extending to one side of the shredder 1013. The arcuate shield member (1020) is positioned in one position in FIG. 20B to cause most of the filamentary matter to exit to the right through the blowers (1014a) and chute (1015). In this embodiment, the arcuate shield member (1020) is particularly semicircular or nearly so in shape to permit greater flow control (i.e., can be selectably positioned so as leave substantially one exit/discharge location for the bale filamentary material). When the semi-circular shield (1020) is positioned in the position shown in FIG. 20B, most of the filamentary matter is directed directly out on the left side past guide member (1021) along the direction of arrow (1020b) by the force of the flails (1013f) of the rotor (1013). The bale is rotated using rollers (1016a/1016b) though other conveyors, such as a chain conveyor, could be used instead. The semi-circular shield (1020) just slides in and is guided by a semi-circular slot (not shown) operatively attached to the frame.

Figure 21A:
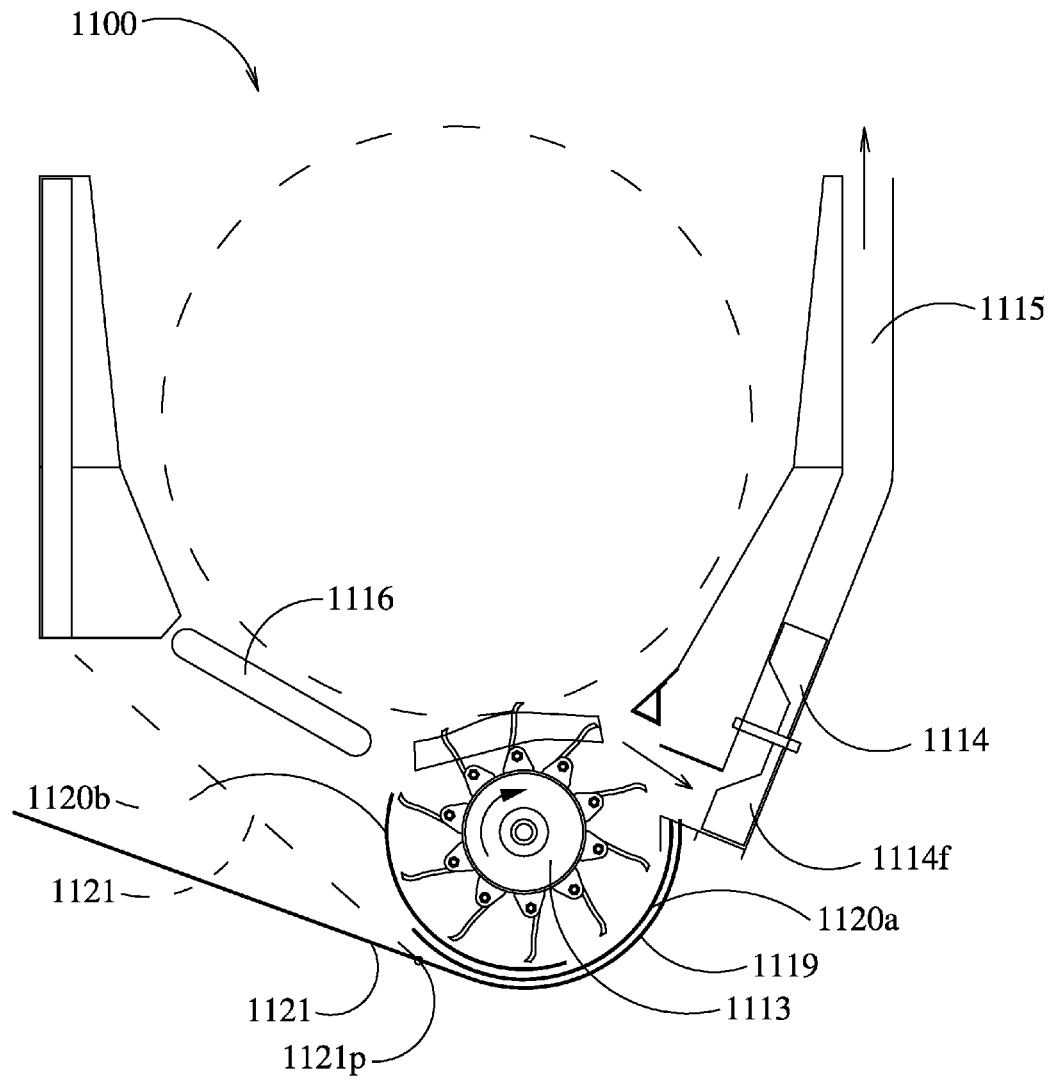
FIGS. 21A and 21B are schematic views of an embodiment showing that a material diverting shield can be in two or more pieces on the inside of a shroud around the shredder/rotor.
Figure 21B:
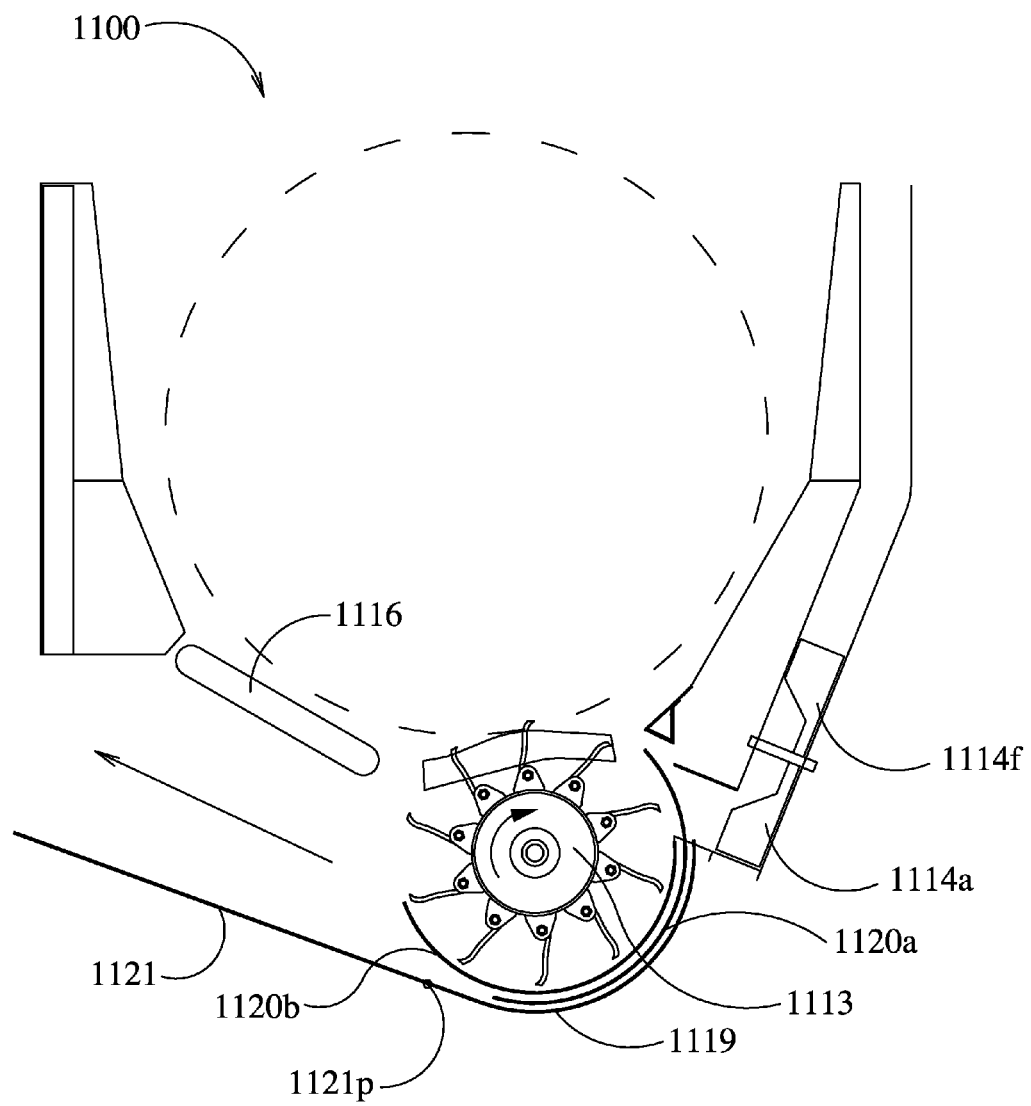

FIGS. 21A and 21B are schematic views of an embodiment (1100) showing that a material diverting shield (1120a/1120b) in two pieces on the inside of a shroud (1119) around the shredder/rotor (1113). In FIG. 21A the first shield part (1120a) is positioned so as that the first passageway proximate the shredder/rotor (1113) is open and the second shield part (1120b) is located so the second passageway is closed so that the filamentary material will go out the discharge chute (1115) via the fan (1114). In FIG. 21B the shield part (1120b) is open and the shield part (1120a) is closed so that the filamentary material will go out the discharge chute (1115) directly via shredder (1113). The respective shield parts (1120a/1120b) are used to open or close respective discharge passageways depending upon which side a user wants the material from the shredder 1113 to flow.

Referring again to FIGS. 21A and 21B, another alternate way to close the side of the flow path over guide member (1121) is shown and includes a first arcuate guide portion under the rotor/shredder 1113 and flat guide extension extending to one side of the shredder 1113. In FIG. 21A the flow guide member (1121) has a hinge or pivot (1121p) so that the flow guide member (1121) can be pivoted between the solid line position to allow flow of filamentary material from the bale shredder (1113) out the left side as shown in FIG. 21A. And if it is desired to prevent flow to the left side as shown in FIG. 21A, then the flow guide member (1121) would be pivoted to the dashed line position shown in FIG. 21A. This pivoting of the flow guide member (1121) could be used instead of the arcuate member (1120b).

It is to be understood that the FIGS. 12-21B embodiments are not required to have double or multiple fan blowers on one side as in the embodiments of FIGS. 1-11. These FIGS. 12-21B embodiments are workable with single or multi-fan blowers. With respect to FIGS. 12-21B, while two rollers or one chain conveyor is shown for bale rotation, it is to be understood that one, three, four, etc. rollers could be employed, or that at least one roller and a drive chain/belt could be used in tandem.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept as expressed by the attached claims.

We claim:

1. A bale processor comprising:
   a frame;
   a bale chamber disposed on the frame, the bale chamber being defined by a plurality of chamber walls;
   a bale shredder operably positioned within the bale chamber; and
   a plurality of blowers mounted proximate one another along a chosen chamber wall, each blower respectively including a blower chamber and a blower fan operably mounted within the corresponding blower chamber, each blower chamber defining a respective chamber height and having a respective blower intake zone defined therein, each blower intake zone connecting the respective blower chamber with the bale chamber and each blower intake zone being configured for receiving a respective amount of the bale filamentary material there through, each blower intake zone having an intake zone height less than a corresponding chamber height, the corresponding blower fan being configured for receiving and suctioning the respective amount of bale filamentary material through the respective blower intake zone and for moving the respective amount of the bale filamentary material toward a corresponding blower output; and
   a delivery chute affixed relative to the chosen chamber wall and adjacent at least one of the blower outputs, the delivery chute extending to a release height above the bale chamber, the delivery chute and the plurality of blowers defining a bale filament flow path there between.

2. The bale processor of claim 1, wherein the plurality of blowers includes a first blower and a second blower.

3. The bale processor of claim 2, wherein the first blower has a first diameter, the second blower having a second diameter, the chosen chamber wall extending between a pair of other chamber walls, the chosen chamber wall having a wall width, the wall width being the distance of the pair of other chamber walls, the first diameter and the second diameter together substantially approximating the wall width.

4. The bale processor of claim 2, wherein the second blower is located between the first blower and the delivery chute, the first blower being configured to receive a first amount of the bale filamentary material through the corresponding blower intake zone and to deliver, through the corresponding blower output thereof, the first amount of the bale filamentary material to the second blower.

5. The bale processor of claim 4, wherein the second blower is configured to receive a second amount of the bale filamentary material through a corresponding blower intake zone and further configured to deliver both the second amount of the bale filamentary material and the first amount of the bale filamentary material to the delivery chute.

6. The bale processor of claim 4, wherein the first blower and the second blower are configured to rotate in a same direction.

7. The bale processor of claim 2, wherein the delivery chute is located between the first blower and the second blower the delivery chute, the first blower and the second blower both being configured for delivering a corresponding amount of the bale filamentary material directly to the delivery chute.

8. The bale processor of claim 7, wherein the first blower and the second blower are configured to rotate in opposing directions.

9. The bale processor of claim 8, wherein the respective blower fans of the first blower and the second blower are within about 4 inches of one another.

10. The bale processor of claim 1, wherein the bale shredder extends adjacent the corresponding blower intake zones of the respective blowers.

11. The bale processor of claim 10, wherein the corresponding blower intake zones of the respective blowers are coextensive.

12. The bale processor of claim 10, wherein each blower has a respective blower diameter, the corresponding blower intake zone height of the respective blowers each being about ⅓ of the respective blower diameter or less.

13. The bale processor of claim 12, wherein each blower has a respective blower diameter of about 3 feet, the respective intake zones of the corresponding blowers having a respective intake zone height that is greater than about 4 inches less than about 14 inches.

14. The bale processor of claim 1, further comprising a set of wheels mounted to the frame and a tow hitch, thereby making the bale processor a trailer implement, the trailer implement having a street-legal width.

15. The bale processor of claim 1, wherein the delivery chute associated with the blowers is located on a first side of the bale chamber, the bale processor further comprising a side delivery discharge zone directed toward a second side of the bale chamber.

16. The bale processor of claim 15, wherein at least one of the delivery chute and the side delivery discharge zone is selectable for delivery of the bale filamentary material therefrom.

17. The bale processor of claim 1, wherein the plurality of blowers mounted proximate one another along a chosen chamber wall are disposed at a bottom of the chosen wall.

18. A bale processor comprising:
   a frame;
   a bale chamber mounted on the frame, the bale chamber defining at least a first chamber wall;
   a bale shredder operably positioned within the bale chamber;
   a plurality of blowers mounted proximate one another along a chosen chamber wall, each blower respectively including a blower chamber and a blower fan operably mounted within the corresponding blower chamber, each blower chamber defining a respective chamber height and having a respective blower intake zone defined therein, each blower intake zone connecting the respective blower chamber with the bale chamber and each blower intake zone being configured for receiving a respective amount of the bale filamentary material there through, each blower intake zone having an intake zone height less than a corresponding chamber height, the corresponding blower fan being configured for receiving and suctioning the respective amount of bale filamentary material through the respective blower intake zone and for moving the respective amount of the bale filamentary material toward a corresponding blower output; and a delivery chute affixed relative to the chosen chamber wall and adjacent at least one of the blowers, the plurality of blowers defining a flow path between the bale chamber and the delivery chute, the plurality of blowers being configured to promote flow from the bale chamber to the delivery chute.

* * * * *